United States Patent
Milender et al.

(12) 
(10) Patent No.: US 6,626,036 B2
(45) Date of Patent: Sep. 30, 2003

(54) CLUTCH FILL RATE CALIBRATION APPARATUS AND METHOD

(75) Inventors: Jeffrey Milender, Valley City, ND (US); Bradley Johnson, Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/994,162

(22) Filed: Nov. 26, 2001

(65) Prior Publication Data

US 2003/0097874 A1 May 29, 2003

(51) Int. Cl.[7] ............................................. G01M 19/00
(52) U.S. Cl. ................................... 73/168; 73/1.35
(58) Field of Search .................. 73/168, 1.16, 1.35; 701/67

(56) References Cited

U.S. PATENT DOCUMENTS

| | | | | |
|---|---|---|---|---|
| 3,981,199 A | * | 9/1976 | Moore et al. ................. 73/420 |
| 4,617,968 A | * | 10/1986 | Hendrixon ............. 137/625.64 |
| 4,895,081 A | * | 1/1990 | Homer et al. ......... 110/101 CC |
| 4,989,471 A | * | 2/1991 | Bulgrien .................... 74/336 R |
| 5,902,344 A | * | 5/1999 | Eike et al. ..................... 701/67 |
| 6,035,903 A | * | 3/2000 | Few et al. ..................... 141/98 |
| 6,112,855 A | * | 9/2000 | Camacho et al. ............. 184/1.5 |
| 6,205,875 B1 | * | 3/2001 | Eike et al. ..................... 74/335 |
| 6,341,552 B1 | * | 1/2002 | Potter et al. ................... 91/433 |

FOREIGN PATENT DOCUMENTS

| | | | | |
|---|---|---|---|---|
| EP | 000786609 A2 | * | 7/1997 | ........... F16H/61/08 |
| EP | 001150031 A1 | * | 10/2000 | ........... F16D/48/06 |
| JP | 410231859 A | * | 9/1998 | ........... F16D/25/14 |

* cited by examiner

*Primary Examiner*—Hezron Williams
*Assistant Examiner*—Charles D Garber
(74) *Attorney, Agent, or Firm*—John William Stader; Rebecca L. Henkel

(57) ABSTRACT

A system for calibrating the fill times of clutches using a pressure transducer service tool includes attaching the tool to an electronic controller on the vehicle and the a clutch hydraulic fluid line, signaling the controller to calibrate the clutch, then removing the service tool. The tool is sequentially moved from one clutch hydraulic line to another to calibrate several clutches. A single service tool with several transducers and a means of switching between them may also be used. The process is automated and the controller signals the user when to make the various connections. The operator then signals the controller when the connections have been made and calibration commences automatically.

11 Claims, 11 Drawing Sheets

US 6,626,036 B2

CLUTCH FILL RATE CALIBRATION APPARATUS AND METHOD

FIELD OF THE INVENTION

The invention relates generally to work vehicles having power shift transmissions. More particularly, it relates to automated methods for calibrating the clutches in the power shift transmissions using removable calibration tools.

BACKGROUND OF THE INVENTION

Power shift transmissions are commonly used in a variety of work vehicles ranging from road graders to agricultural tractors. As the term is generally used in the construction and agricultural equipment industries, a power shift transmission is a transmission that can be shifted from gear ratio to gear ratio without significantly reducing the power output of the transmission during the shift.

In order to do this, the transmissions are arranged with several internal shafts that are each equipped with one or more hydraulic clutches. These clutches are typically multi-plate "wet" clutches that are immersed in hydraulic fluid. To change from gear ratio to gear ratio, one or more clutches are disengaged substantially simultaneously with the engagement of one or more additional and different clutches by introducing fluid into the clutches being engaged at the same time fluid is released from the clutches being disengaged.

Unlike a typical manual mechanical shift transmission in which there is one clutch located outside of the transmission which engages and disengages the engine from the transmission, and wherein manual manipulation of the shift lever causes gears to slide on shafts within the transmission in order to effect the gear change, a power shift transmission connects or disconnects gears by locking them or unlocking them to the corresponding shafts by the engagement and disengagement, respectively, of their corresponding clutches. Generally speaking, in a full power shift transmission all of the gears are always in mesh. What shifts the transmission is the locking and unlocking of particular gears to their corresponding shafts.

One of the benefits of this arrangement is that the time required to disengage the transmission from one gear ratio and engage the transmission in another gear ratio is significantly reduced. A gearshift in a power shift transmission can occur in as little as fifty or one hundred milliseconds.

One danger in this shifting process is that of wear or damage to internal parts. As one set of clutches is disengaged and another set is engaged, at some point all the clutches may be simultaneously engaged. This can cause serious damage to the transmission as gear teeth break, or extreme wear as the clutches are forced to slip with respect to each other. Alternatively, if neither the gears break or the clutches slip, simultaneous engagement in two gear ratios can bring the engine to a sudden and precipitous stop. This is called "four-squaring the transmission".

The opposite danger is that of being disengaged from any gear ratio for too long. If the power shift transmission is on a tractor pulling a sixteen-bottom plow through a field, for example, and if the gear shifting permits the vehicle to be disengaged from the engine for a half a second or a second, the tractor may stop completely due to the extreme load before the new gear ratio is engaged. Once stopped, it may be necessary to shift down to the lowest gear ratio to start the tractor moving again. This would effectively prevent the tractor from being used in any of the higher gear ratios when a large load is on the tractor.

For this reason, the timing of clutch engagement and disengagement is of critical importance when shifting. To accurately coordinate the engagement and disengagement of the clutches, it is necessary to determine the amount of time between the operator's command to the clutches to engage or disengage and to use this information to "schedule" shifts. By "scheduling" I refer to the process of using the time delay between the time a command is given to an electronic valve controlling fluid flow to a clutch and the time that clutch is actually filled with fluid and begins to engage to determine the proper times of clutch valve energization and de-energization.

Determining the time delay between applying an electrical signal to a clutch valve and the corresponding clutch engagement or disengagement is not a trivial task, nor, for most vehicles can it be measured once and stored in an electronic memory for perpetual use.

As the hydraulic components of the work vehicle wear, the time delay (also known as the "clutch fill time") can vary, sometimes dramatically. For this reason, it is important that the clutch fill time be periodically re-measured and stored in the electronic circuitry that schedules the transmission shifts. In some applications, such as when small engines are used in demanding applications it may be necessary to determine the clutch fill times of the clutches on an almost continuous basis. In this case, the work vehicle is usually equipped with several clutch fill time sensors that are permanently attached to the electronic circuitry and re-measure the clutch fill times for each clutch as the vehicle actually works in the field. For other vehicles, this continual clutch fill time calibration may not be necessary.

If clutch fill time calibration is only necessary every few weeks or few months, it may be possible to reduce the complexity of the electronic circuitry and reduce the cost of the work vehicle by configuring the electronic circuitry of the work vehicle to automatically interact with a maintenance person or operator and with a removable clutch calibration service tool that are together capable of determining the clutch fill time and saving the clutch fill time in the electronic circuitry.

By providing a removable service tool that need only be connected to the work vehicle electronic circuitry every few months during the calibration process, the cost of the vehicle could be reduced by several hundred dollars. It is an object of this invention to provide such a system and method.

SUMMARY OF THE INVENTION

In accordance with a first embodiment of the invention, a method for calibrating hydraulic clutches in a powershift transmission of a work vehicle is provided which includes the steps of manually connecting a pressure transducer to a first hydraulic fluid conduit extending between a first clutch control valve and a first clutch in the powershift transmission such that the pressure transducer generates an electronic pressure signal indicative of the fluid pressure in the first clutch, manually connecting the pressure transducer to an electronic transmission controller on the vehicle, wherein the electronic transmission controller is configured to drive the pressure transducer and to receive the electronic pressure signal, electronically signaling the first clutch valve to fill the first clutch with hydraulic fluid, electronically monitoring the time required to fill the first clutch, recording a digital value indicative of the time required to fill the first clutch in an electronic memory of the electronic transmission controller, manually disconnecting the first pressure transducer from the first conduit, and manually disconnecting the first pressure transducer from the electronic transmission controller.

The step of manually connecting to a first conduit may include the step of fluidly coupling the first pressure transducer to a quick-connect coupling mounted on the transmission. The pressure transducer may be electrically connected to a first electrical connector such that the transducer and connector together define a removable and replaceable structure and further wherein the step of connecting to the controller includes the step of coupling the first electrical connector to a mating electrical connector on the work vehicle, wherein the mating electrical connector is electrically coupled to the electronic transmission controller. The step of electronically monitoring may include the step of comparing a digital value indicative of a current clutch pressure signal provided by the pressure transducer with a digital value indicative of at least one past clutch pressure signal provided by the pressure transducer. The step of comparing may include the step of determining that the digital value indicative of a current clutch pressure signal is greater than the digital value indicative of at least one past clutch pressure signal by a predetermined pressure difference. The step of electronically storing may include the steps of calculating a digital elapsed time value in the electronic transmission controller indicative of the elapsed time from the step of electronically signaling to the time of the step of determining, and saving the digital elapsed time value in the electronic transmission controller. The method may include the step of subtracting a predetermined time interval from the digital elapsed time value to generate a reduced digital elapsed time value, and saving the reduced digital elapsed time value in the electronic transmission controller. The step of purging the first clutch, prior to the step of electronically signaling the first clutch valve, may be implemented by electronically energizing, then deenergizing, then energizing, and then deenergizing the solenoid of the first clutch valve. The step of electronically monitoring may include the steps of waiting a predetermined time interval for a fill pressure of the first clutch to stabilize, recording a digital value indicative of the stabilized fill pressure, reading a new pressure signal from the first pressure transducer, comparing the stabilized fill pressure with the new pressure signal, and repeating the steps of reading a new pressure signal and comparing the stabilized fill pressure until the new pressure signal exceeds the stabilized fill pressure signal by a predetermined pressure difference.

In accordance with a second embodiment of the invention, a method of calibrating a plurality of clutches in a powershift transmission with a pressure transducer is provided, including the steps of manually connecting a pressure transducer to a first hydraulic conduit that extends from a first clutch control valve to a first hydraulic clutch in the transmission to provide an electronic pressure signal indicative of the fluid pressure in the first clutch, manually connecting the pressure transducer to an electronic transmission controller on the vehicle, wherein the electronic transmission controller is configured to receive the pressure signal, electronically signaling the first clutch valve in a clutch valve manifold to fill the first clutch with hydraulic fluid, electronically monitoring the time required to fill the first clutch, recording a first digital value indicative of the time required to fill the first clutch in an electronic memory of the electronic transmission controller, manually disconnecting the pressure transducer from the first hydraulic conduit, manually connecting the pressure transducer to a second hydraulic conduit that extends from a second clutch control valve to a second hydraulic clutch in the transmission to generate an electronic pressure signal indicative of the fluid pressure in the second clutch, electronically signaling the second clutch valve in the clutch valve manifold to fill the second clutch with hydraulic fluid, electronically monitoring the time required to fill the second clutch, recording a second digital value indicative of the time required to fill the second clutch in the electronic memory of the electronic transmission controller, manually disconnecting the pressure transducer from the second hydraulic conduit, and manually disconnecting the pressure transducer from the electronic transmission controller.

The steps of manually connecting may include the step of fixing the pressure transducer to quick-connect couplings, and the steps of manually disconnecting may include the step of removing the pressure transducer from the quick-connect couplings. The step of electronically signaling the first clutch valve may include the step of manually signaling the electronic transmission controller that the pressure transducer is fluidly coupled to the first clutch, and the step of electronically signaling the second clutch valve may include the step of manually signaling the electronic transmission controller that the pressure transducer is fluidly coupled to the second clutch.

In accordance with a third embodiment of the invention, a method of automatically calibrating the fill time of a plurality of hydraulic clutches in a powershift transmission of a work vehicle using a test instrument comprised of at least first and second electronic pressure transducers electrically coupled to the inputs of a switch box, the switch box having an electrical output switchably connectable to at least the first and second pressure transducers is provided, including the steps of fluidly connecting the first transducer to a hydraulic fluid supply line of a first hydraulic clutch of the plurality of clutches, fluidly connecting the second transducer to a hydraulic fluid supply line of second hydraulic clutch of the plurality of clutches, coupling the output of the switch box to an electronic controller of the work vehicle, selecting the first pressure transducer at the switch box to thereby electrically couple the first pressure transducer to the electronic controller, manually indicating to the electronic controller that the first transducer has been selected, electronically determining the fill time of the first clutch using the first transducer, selecting the second pressure transducer at the switch box to thereby electrically couple the second pressure transducer to the electronic controller, manually indicating to the electronic controller that the second transducer has been selected, and electronically determining the fill time of the second clutch using the second transducer.

The step of fluidly connecting the first pressure transducer may include the step of connecting the first pressure transducer to a first quick-connect coupling. The step of fluidly connecting the second pressure transducer may include the step of connecting the second pressure transducer to a second quick-connect coupling. The quick connect coupling may be mounted on a transmission shaft bearing end cap. The end cap may define a cap hydraulic line that communicates hydraulic fluid to a shaft hydraulic fluid line machined in a transmission shaft supported in the transmission. The quick connect coupling may be mounted on a clutch valve manifold that includes a plurality of electronically actuated clutch control valves for controlling a corresponding plurality of flows of hydraulic fluid to corresponding plurality of clutches in the transmission. The first clutch control valve may be one of the plurality of valves.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
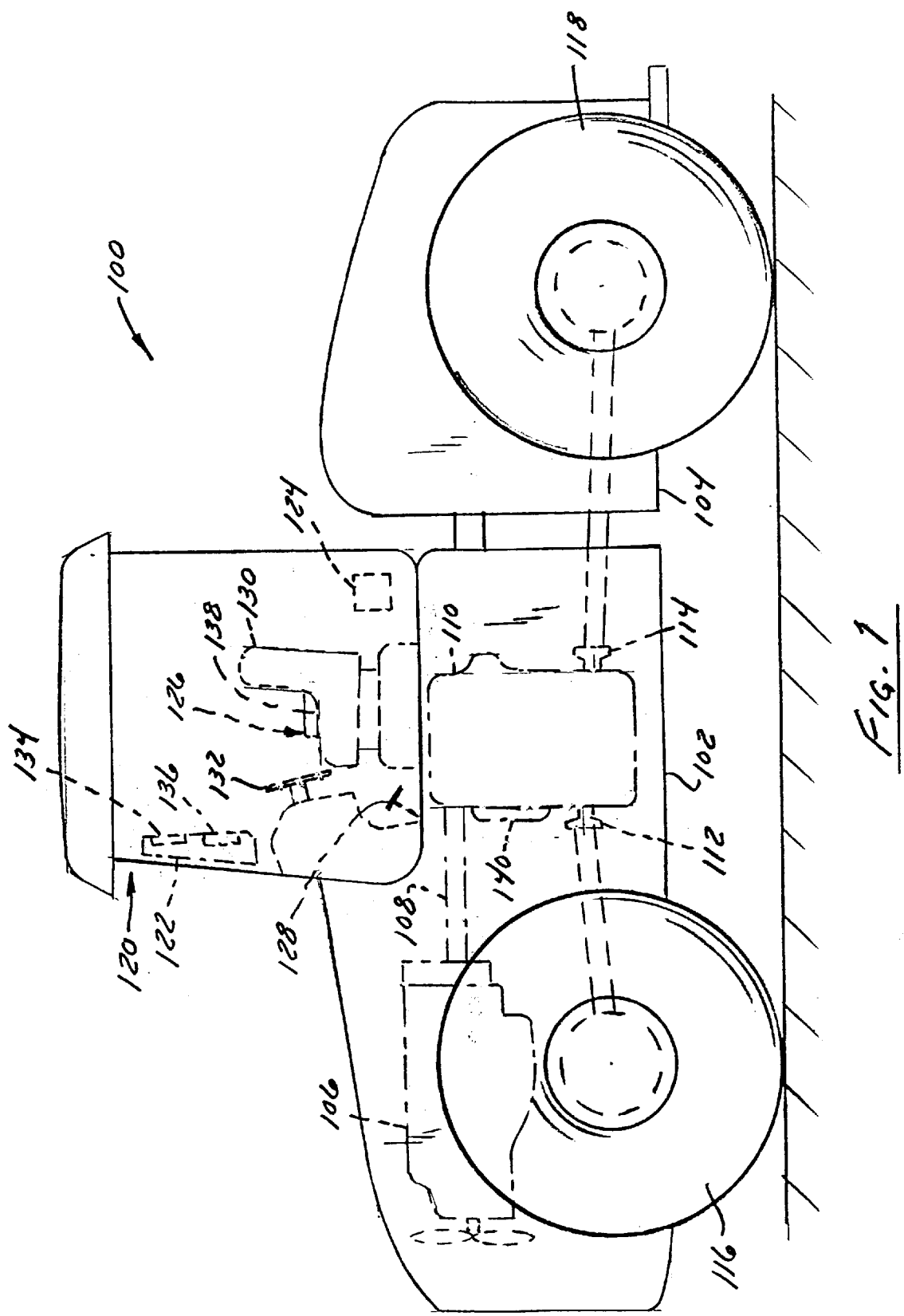
FIG. 1 is a side view of a work vehicle configured for clutch calibration in accordance with the present invention.

FIG. 1 shows a work vehicle 100 here illustrated as an agricultural tractor. The vehicle includes a vehicle frame comprising a front frame 102 and a rear frame 104. An engine 106 drives the work vehicle 100 over the ground and is mounted in the front frame. A drive shaft 108 is coupled to the engine and transmits the engine's rotary power to a transmission 110. Drive shaft 108 is rotationally coupled to both the engine and to an input shaft (not shown) of transmission 110.

Transmission 110 includes a forward output shaft 112 and a rear output shaft 114 that are respectively coupled to front wheels 116 and rear wheels 118. Power supplied by the engine is transmitted through transmission 110, which then transmits the power to the two output shafts and thence to the front and rear wheels, both of which are driven by the engine. The transmission, the engine and the wheels are all supported on the frame of the tractor.

FIG. 1 also illustrates the operator's control station 120 from which the operator controls the vehicle as it moves through a field. The operator control station includes an instrument cluster unit (ICU) 122, a transmission control unit (TRCU) 124, an operator actuated shift lever 126 used to shift the work vehicle into forward, neutral, reverse, and park (also known as the "FNRP lever"), a clutch pedal 128 mounted on the floor and actuated by the operator's foot, an operator seat 130 and a vehicle steering wheel 132.

ICU 122 includes an LCD display 134 and several switches 136 that are used to transmit operator commands to ICU 122. Display 134 is used to present a series of menus (discussed below) instructing the operator to take certain actions during clutch calibration as well as to display, during vehicle operation through the field, certain operational parameters of the vehicle 100. ICU 122 is a microprocessor-based control unit including a microprocessor, RAM, and ROM. It is connected over a serial communications line (FIGS. 2 and 4) to TRCU 124.

Shift lever 126 is mechanically coupled to and extends from pod 138 which includes forward, neutral, park, and reverse switches that indicate the position of lever 126 whenever the operator selects forward, neutral, reverse or park. These switches are electrically connected to TRCU 124.

Clutch pedal 128 is operated by the operator's foot and is connected to a bottom-of-clutch switch (FIGS. 2 and 4) that is engaged whenever the operator presses pedal 128 to the floor of the operator station 120. This bottom-of-clutch switch is electrically connected to TRCU 124.

TRCU 124 is an electronic control unit that includes a microprocessor, RAM, and ROM. It is electrically connected to, and controls, each of the electrohydraulic clutch valves that control (i.e. engage and disengage) the hydraulic clutches inside transmission 110. TRCU 124 stores in its ROM memory the clutch fill time values that are determined as a result of the clutch calibration process and uses these values to schedule transmission shifts. In addition, TRCU 124 and ICU 122 store a sequence of digital program instructions that direct the operator to perform the appropriate actions during the clutch calibration process, described in more detail below.

Transmission 110 is a power shift transmission and has nine internal hydraulic clutches (not shown) that are used to engage the transmission in several forward and reverse gear ratios. It is these clutches, mounted on one of the several internal shafts of the transmission, that are calibrated during the clutch fill time calibration process. A valve manifold 140 is fixed to the front end of transmission 110. The manifold includes eight of the nine electrohydraulic clutch valves that control the engagement and disengagement of the clutches. A ninth electrohydraulic clutch valve is fixed to transmission 110 at another location and controls the engagement and disengagement of another clutch in the transmission.

It should be understood that many more controls are provided on work vehicle 100 for operating the engine, transmission, and other components of the vehicle. The controls that are illustrated in FIG. 1 are those that relate to particularly to the process of calibrating the electrohydraulic clutch valves to calibrate the clutches in the transmission.

Figure 2:
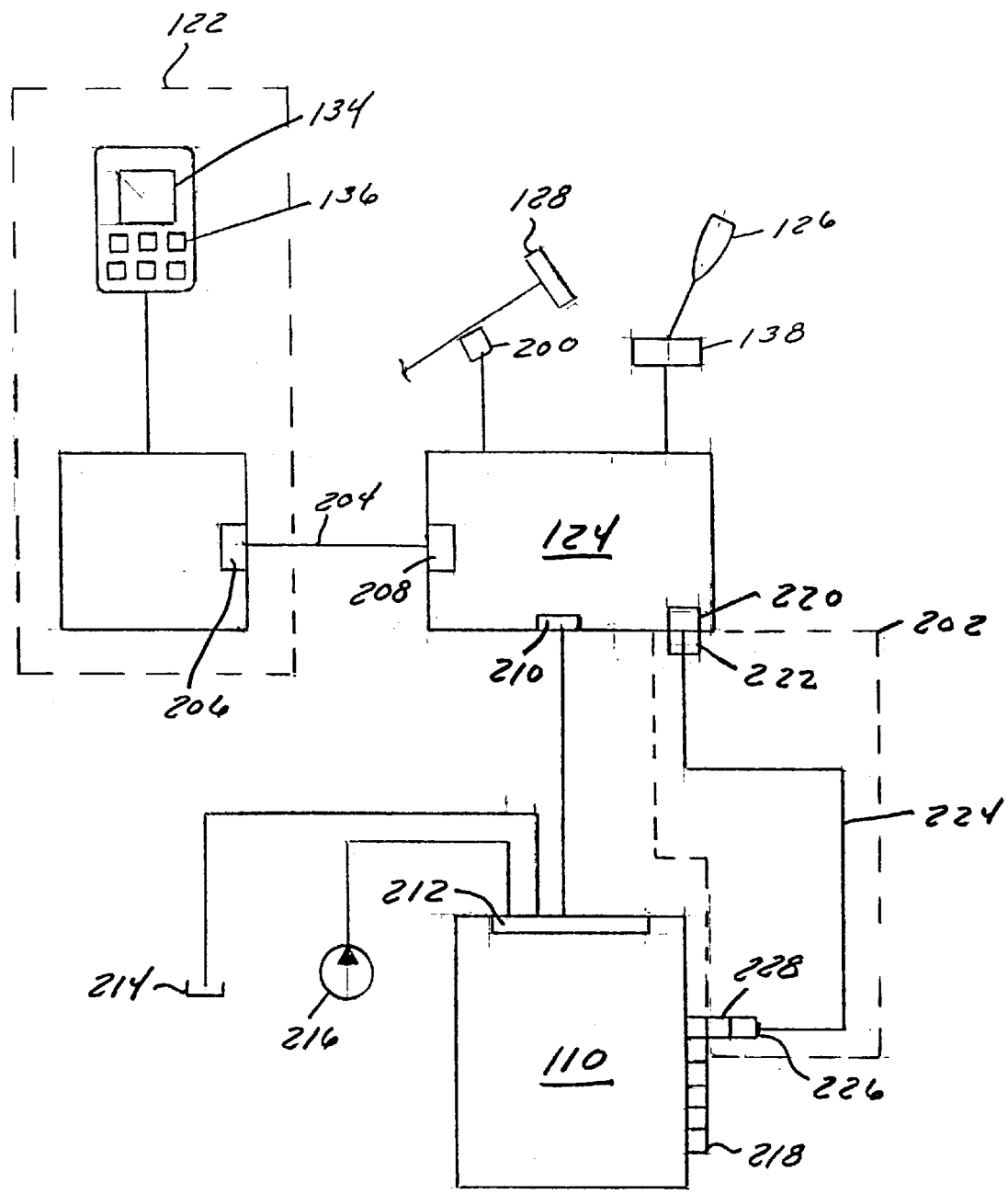
FIG. 2 is a schematic diagram of the electronic circuitry of the work vehicle of FIG. 1 together with the first embodiment of the service tool used to calibrate the transmission of the work vehicle of FIG. 1.

FIG. 2 shows the control system for calibrating the clutches and for operating the transmission. It includes ICU 122, TRCU 124, and transmission 110. In addition, the operator controls that the user manipulates to perform the calibration functions are also shown. These include shift lever 126, pod 138 with its internal forward, neutral, reverse and park switches, clutch pedal 128, bottom of clutch switch 200, display 134, and the operator interface buttons or switches 136 used to signal the microprocessor in ICU 122.

In addition, a removable service tool 202 is shown that is electrically coupled to and between TRCU 124 and to transmission 110. TRCU 124 and ICU 122 are electrically coupled using serial communication line 204. This line transmits packetized data between ICU 122 and TRCU 124 and is driven by serial communications circuit 206 in ICU 122 and 208 in TRCU 124. These circuits, in turn, are coupled to the microprocessors in each of ICU 122 and TRCU 124 to permit their microprocessors to transmit and receive data from the other control unit. Serial communications circuits 206 and 208 are preferably CAN bus communication circuits that communicate in accord with the SAE J1939 communications standard. TRCU 124 includes valve driver circuits 210 that receive valve opening and valve closing signals from the microprocessor in TRCU 124 and convert them into signals with a magnitude sufficient to open and close electrohydraulic clutch valves 212.

Clutch valves 212 are preferably on/off valves operated by included electrical solenoids or coils. They selectively connect their corresponding clutches in transmission 110 to a hydraulic tank 214 and a hydraulic pump 216.

Tank 214 provides a low-pressure reservoir for receiving fluid expelled from the clutches as the clutches are disengaged.

Pump 216 provides a source of high-pressure hydraulic fluid for pressurizing and engaging hydraulic clutches in transmission 110.

When valves 212 are energized by driver circuits 210, they connect their corresponding clutches to pump 216 and the clutches fill with pressurized hydraulic fluid provided by pump 216. This engages their clutches. When they are deenergized, they connect their corresponding clutches to tank 214 thereby permitting fluid to leave their clutches and return to tank 214. This disengages their clutches.

Transmission 110 also includes nine fluid couplings 218. Each fluid coupling provides a hydraulic fluid connection to a hydraulic line extending from a valve 212 to a corresponding clutch. Hence, in this, the preferred embodiment, there are nine clutches and nine associated fluid couplings.

While this is the preferred embodiment it should be understood that different transmissions have different numbers of clutches and therefore there would be differing numbers of fluid couplings associated with each of those clutches and their associated valves.

It is anticipated that in many clutches not every clutch valve will need to be calibrated. If this is the case, there will only be as many fluid couplings 218 as there are clutches that need to be calibrated according to the present method.

TRCU 124 also includes an electrical connector 220 to which service tool 202 is connected. Connector 220 is preferably a plug-type connector, either male or female in configuration. It permits service tool 202 to be quickly and easily connected and disconnected from TRCU 124 when the clutches in transmission 110 are calibrated.

A rubber or polymeric boot (not shown) may be provided to cover connector 220 when the vehicle is in operation and the service tool is disconnected in order to prevent contamination and corrosion of connector 220. Connector 220 is preferably mounted permanently on vehicle 100 in the vicinity of transmission 110 and is connected to the microprocessor circuitry of TRCU 124 by a wire harness.

Service tool 202 has a connector 222 that mates with connector 220. As with connector 220, mating connector 222 is preferably a plug-type connector, either male or female, that provides for quick connection to connector 220. A wire loom 224 connects mating connector 222 to pressure transducer 226 and has a length sufficient to permit pressure transducer 226 and pressure transducer coupling 228 to reach each of fluid couplings 218 on transmission 110 when connector 222 is connected to connector 220.

Pressure transducer 226 is fixed to the distal end of wire loom 224 away from mating connector 222. It is fixed to coupling 228. Coupling 228, in turn, is configured to couple to any of fluid couplings 218. Pressure transducer coupling 228 and fluid couplings 218 are preferably of the quick connect variety such as the sliding collar and ball detent type shown in FIG. 3.

Figure 3:
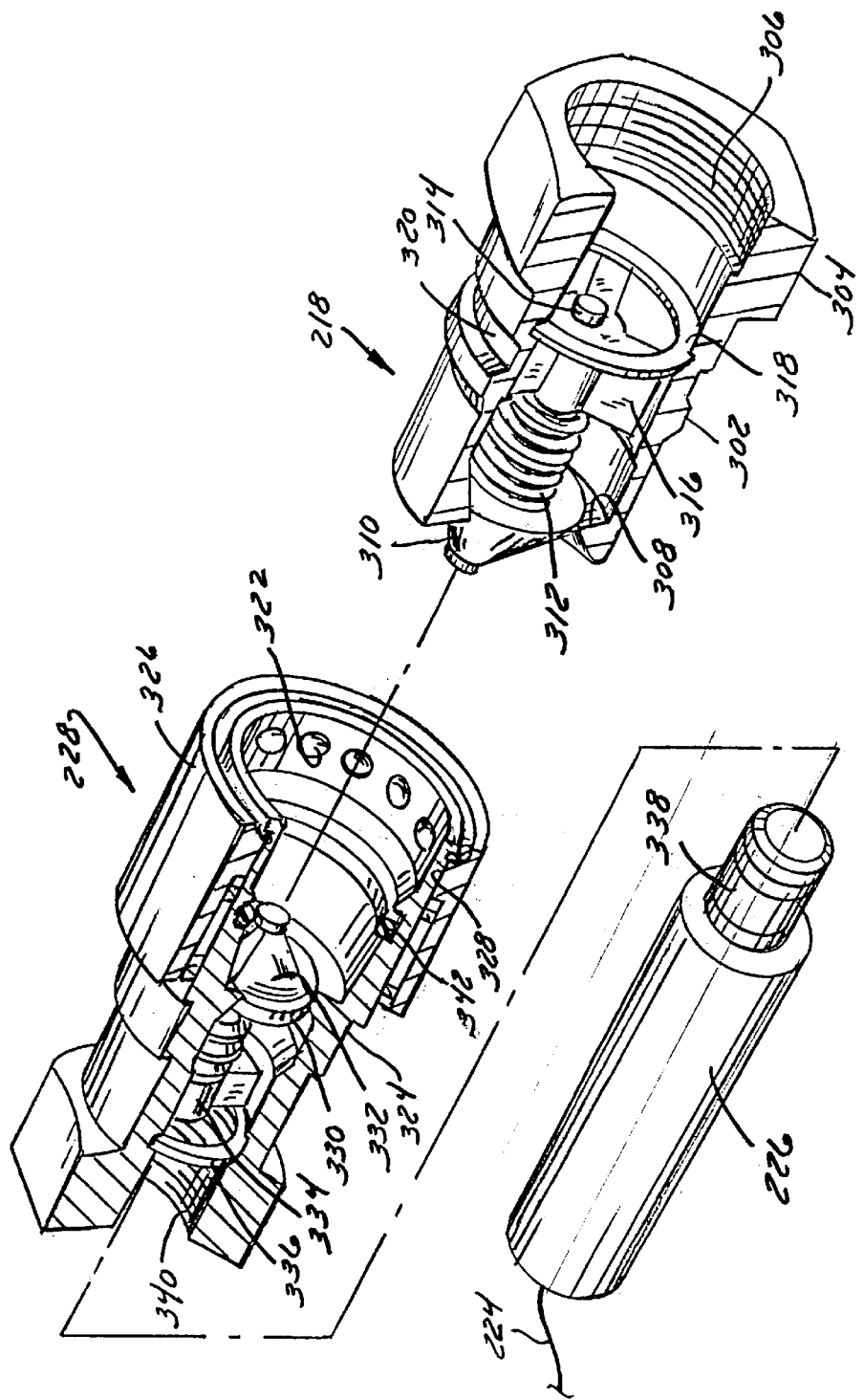
FIG. 3 is a perspective view of the quick-connect hydraulic couplings and pressure transducer used to fluidly connect the pressure transducer of the service tool to a hydraulic line extending between the clutch control valve and the clutch in transmission that is to be calibrated.

Referring now to FIG. 3 we can see a preferred embodiment of a typical fluid coupling 218, pressure transducer coupling 228, and pressure transducer 226 in more detail.

Fluid coupling 218 includes a generally cylindrical and hollow body 302 having a first end 304 with internal threads 306 configured to fix fluid coupling 218 to the fluid path or conduit extending from one clutch valve 212 to its corresponding clutch. Since there are nine clutches each with its own corresponding clutch valve, and a corresponding conduit extending between each valve and its clutch, there are nine couplings 218 on transmission 110. Fluid coupling 218 is preferably fixed to transmission 110, or to a hydraulic line fixed at one end to transmission 110 and extending to fluid coupling 218. The second end of body 302 defines a valve seat 308 that is generally conical in shape.

A valve element 310 is disposed inside body 302 and abuts valve seat 308 to provide a fluid tight connection that is configured to prevent fluid from leaking out of the second end of coupling 218 when pressure transducer coupling 228 is disconnected from coupling 218.

A helical spring 312 is disposed inside body 302 and is fixed to body 302 such that it provides a steady pressure against valve element 310. In this manner, spring 312 holds valve element 310 against valve seat 308 when coupling 228 is removed from coupling 218. It is this spring that maintains valve element 310 in a closed position and prevents leakage.

Valve element 310 includes a shaft 314 that is slidably supported within body 302 permitting valve element 310 to engage valve seat 308 in a first (closed) position and disengage from valve seat 308 in a second (open) position.

Shaft 314 is supported by support 316, which holds valve element 310 in position. A locking ring 318 is fixed to the inner surface of body 302 and abuts support 316 thereby holding support 316 in position within body 302.

The outer cylindrical surface of body 302 includes a circumferential groove 320 that extends about the periphery of body 302 and provides a recess for engaging balls 322 mounted in pressure transducer coupling 228. Balls 322 are supported in hollow and generally cylindrical body 324 of coupling 228. A circumferential collar 326 extends about the outer surface of body 324 and is configured to slide axially with respect to body 324. An inner surface 328 of collar 326 abuts the outer surface of balls 322 holding them in position. Coupling 228, like coupling 218, has a valve that serves to block flow through the hollow interior of body 328. This valve is comprised of a generally conical valve seat 330 formed on the inner surface of body 324. It also includes a valve element 332, a valve support 334, and a locking ring 336 that are constructed the same as the corresponding elements in fluid coupling 218 and function in an identical manner.

Pressure transducer 226 is fixed to the distal end of coupling 228. In the preferred embodiment, pressure transducer 226 has a male threaded end portion 338 that is threadedly engaged with female threads 340 on an end of coupling 228 distal from balls 322. While this is preferred, any method of attaching the pressure transducer to coupling 228 that will permit fluid pressure to be communicated to transducer 226 from coupling 218 is acceptable.

In order to attach service tool 202 to transmission 110 one attaches pressure transducer coupling 228 to fluid coupling 218. To do this, collar 326 is moved axially away from balls 322. This slides inner surface 328 away from the balls and permits balls 322 to move radially outward with respect to body 324. This outward movement permits body 324 to be inserted over the cylindrical outer surface of fluid coupling 218. Once in position, balls 322 are located directly above groove 320. At this point, collar 326 is moved forward with respect to body 324 such that inner surface 328 presses against the back surface of balls 322, forcing them into circumferential groove 320. In this position, coupling 228 and coupling 218 are mechanically locked together.

At the same time that body 324 is inserted over the cylindrical outer surface of body 302, valve elements 310 and 332 touch each other and force each other away from their corresponding valve seats 308 and 330. When the valve elements are forced away from their seats, a fluid path is formed from pressure transducer 226 to first end 304 of body 302. Since first end 304 is fluidly connected to the hydraulic path extending between a clutch valve 212 and its corresponding clutch, this permits hydraulic fluid (having a pressure generally equal to the pressure in the clutch) to act against pressure transducer 226. In turn, pressure transducer 226 generates an electrical pressure signal indicative of the pressure in that path and therefore the pressure in the hydraulic clutch to which it is fluidly connected. This signal is transmitted through wire loom 224, connector 222, connector 220 and thence to TRCU 124, where it is monitored and used to control the calibration process as described below.

To remove coupling 228 from coupling 218, collar 326 is moved backward away from balls 322. This permits balls 322 to move radially outward away from circumferential groove 320. This outward movement unlocks coupling 228 from coupling 218 and permits coupling 228 to be withdrawn from coupling 218. During this withdrawal process, valve elements 310 and 332 are pushed outward by their corresponding springs and again engage their corresponding valve seats. This prevents fluid flow either out of fluid coupling 218 or out of pressure transducer coupling 228.

As a final note, an O-ring 342 is disposed within coupling 228 and is configured to seal against the cylindrical outer surface of fluid coupling 218 when the two couplings are engaged. This serves to reduce or prevent fluid leakage during calibration.

Figure 4:
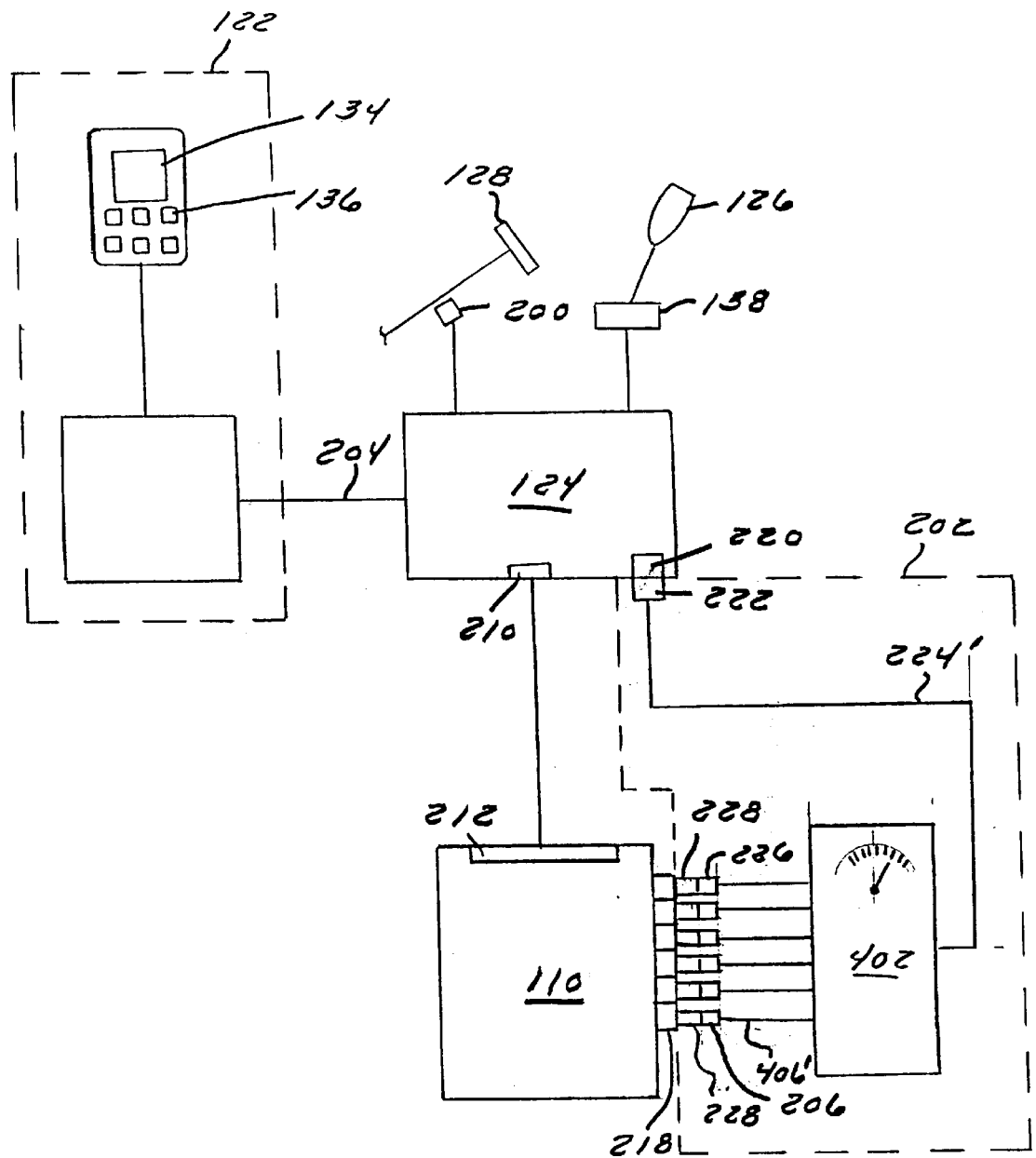
FIG. 4 is a schematic diagram of the electronic circuitry of the work vehicle of FIG. 1 together with a second embodiment of the service tool used to calibrate the clutches in the vehicle's transmission.

FIG. 4 shows another embodiment of the system of FIG. 3 using a different service tool. The systems are configured identically, the only difference being the construction and operation of the service tool.

Service tool 202' shown in FIG. 4 includes the same mating connector 222 illustrated in FIG. 2. Wire loom 224' is the same as wire loom 224. Unlike the embodiment shown in FIG. 2, however, wire loom 224' terminates at switch box 402. Switch box 402 includes a manual switch 404 that is connected to one end of wire loom 224'. Manual switch 404 is also connected to a plurality of wire looms 404. Each of wire looms 404 extends from switch box 402 to a pressure transducer 226. Each of pressure transducers 226 is fixed to a pressure transducer coupling 228. Both pressure transducers 226 and couplings 228 in FIG. 4 are constructed the same as pressure transducer coupling 228 and pressure transducer 226 shown in FIGS. 2 and 3.

Manual switch 404 selectively connects wire loom 224' to each of wire looms 404 in turn, as manual switch 404 is moved from one switch position to another. By rotating manual switch 404, wire loom 224' can be individually and selectively connected to each of pressure transducers 226 in FIG. 4. In this manner, the operator can manually select at switch box 402 which of the pressure transducers 226 he wishes to connect to TRCU 124.

As will be described in greater detail below, as TRCU 124 calibrates each clutch in turn, the operator successively moves manual switch 404 to each of its positions thereby sequentially connecting each of pressure transducers 226 in FIG. 4 to TRCU 124. This permits the sequential calibration of each of the transmission clutches, which are fluidly connected to fluid couplings 218 in FIG. 4 just as in FIGS. 2 and 3.

Fluid couplings 218 in FIG. 4 are constructed identically to fluid couplings 218 in FIGS. 2 and 3. By providing as many pressure transducers 226 and pressure transducer couplings 228 as there are fluid couplings 218, and by connecting all of these transducers to couplings 218 at one time, the operator can sequentially calibrate each of the clutches in transmission 110 by switching manual switch 404 during the calibrations process as each clutch is calibrated. With this alternative service tool, the operator need not disconnect and reconnect the single transducer shown in the service tool of FIG. 2 to each of fluid couplings 218 in turn as each clutch is calibrated.

Service tool 202' is especially convenient for vehicles 100 in which the fluid couplings 218 are located in remote or difficult-to-reach locations. Switchbox 402 can be located away from couplings 218 in a location that is easy to reach. As each clutch is successively calibrated, there is no need for the operator to insert himself under or inside work vehicle 100 near transmission 110 to make and break each coupling-to-coupling connection as each clutch is calibrated. All he need do is initially connect service tool 202' to all of couplings 218 and then initiate clutch calibration. As each clutch is calibrated, he need only manipulate switch 404 on switch box 402 from a convenient location.

Figure 5:
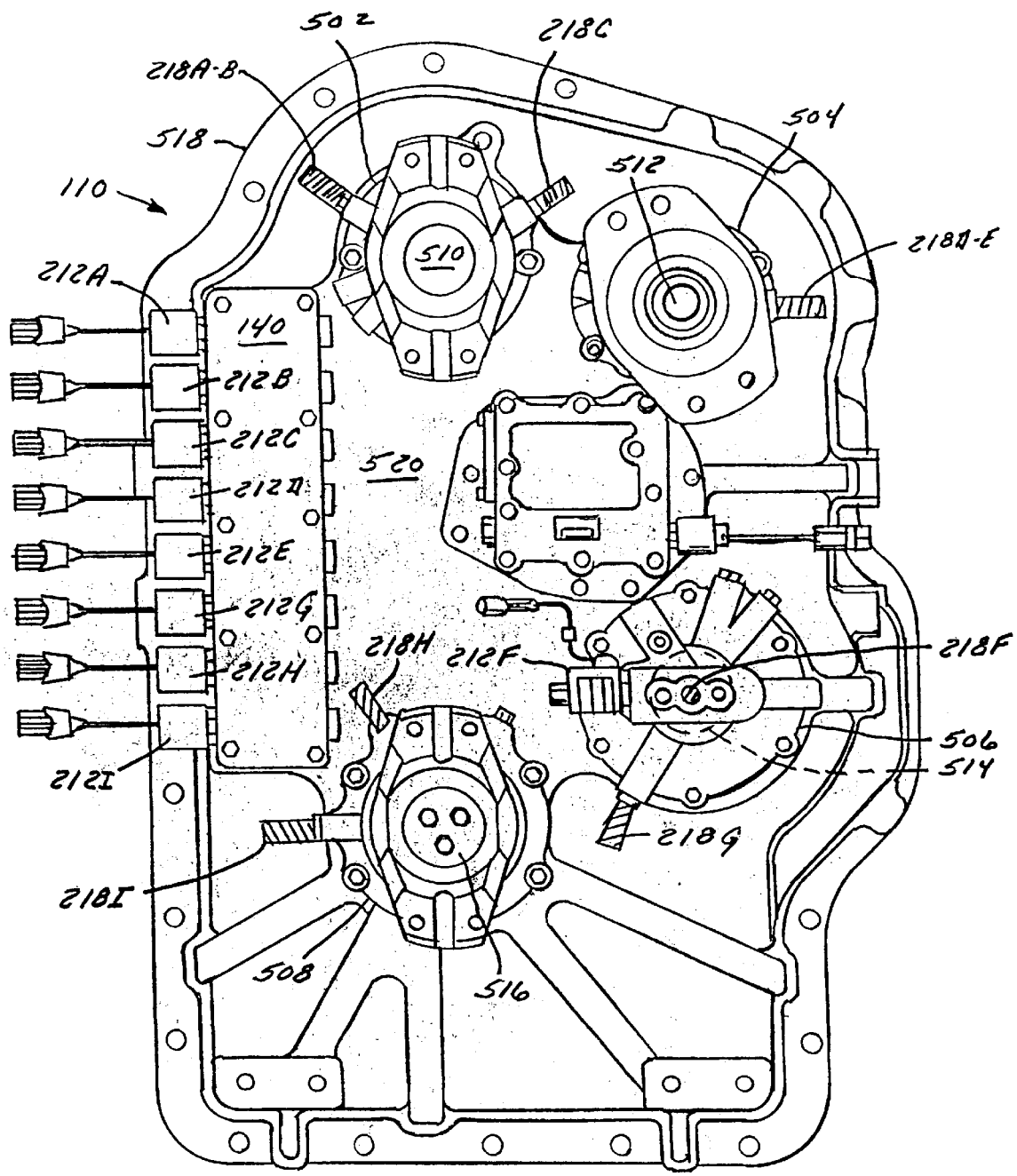
FIG. 5 is an end view of the transmission of FIG. 1 showing the location of the clutch valve manifold and the various couplings to which the service tool is fluidly coupled to calibrate the clutches in the transmission wherein the couplings are located on bearing caps on the transmission.

FIG. 5 is an end view of a preferred embodiment of transmission 110 showing the arrangement of valve manifold 140 including valves 212 as well as couplings 218. Couplings 218 are denominated as items 218A, B, C, D, E, F, G, H, and I. The corresponding clutch valves 212 to which these couplings are fluidly connected are identified items 212A, B, C, D, E, F, G, H, and I.

Each of couplings 218A–I is mounted in corresponding transmission shaft bearing end caps 502, 504, 506, and 508. Hydraulic couplings 218A–C are mounted to bearing end cap 502. Hydraulic couplings 218D–E are mounted to bearing end cap 504. Hydraulic couplings 218F–G are mounted to bearing end cap 506. Hydraulic couplings 218H–I are mounted to bearing end cap 508.

Each of the bearing end caps is configured to support and/or enclose one end of each of the four transmission shafts 510, 512, 514, and 516 that are supported by transmission case 518. Each of these end caps is bolted to end plate 520 of transmission case 518, and is provided with internal passageways (not shown) that conduct hydraulic fluid from valves 212A–I to their corresponding clutches.

Each of shafts 510, 512, 514, and 516 has internal fluid passageways that receive fluid conducted to the shaft via the corresponding end cap and transmit that hydraulic fluid to a corresponding clutch on that shaft.

Shaft 510 has three clutches, hence it has three internal passageways and three couplings 218A–C, fluidly connected to these three passageways. Each of these three passageways is also fluidly connected to and receives its hydraulic fluid from clutch valves 212A–C, respectively. Couplings 218A and B are disposed in a fore-and-aft relation to one another and thus appear in the end view of FIG. 5 as a single coupling.

Shaft 512 has two clutches, hence it has two internal passageways and two couplings 218D–E, fluidly connected to these two passageways. Each of these two passageways is also fluidly connected to and receives its hydraulic fluid from clutch valves 212D–E, respectively. Couplings 218D and 218E are disposed in a fore-and-aft relation to one another and thus appear in the end view of FIG. 5 as a single coupling.

Shaft 514 has two clutches, hence it has two internal passageways and two couplings 218F–G, fluidly connected to these two passageways. Each of these two passageways is also fluidly connected to and receives its hydraulic fluid from clutch valves 212F–G, respectively.

Shaft 516 has two clutches, hence it has two internal passageways and two couplings 218H–I, fluidly connected to these two passageways. Each of these two passageways is also fluidly connected to and receives its hydraulic fluid from clutch valves 212H–I, respectively.

In the preferred embodiment of FIG. 5, couplings 218A–I are disposed as close to their respective clutches as possible. In this manner, pressure transducer 226 provides the most accurate possible reading when it is connected to couplings 218A–I.

Figure 6:
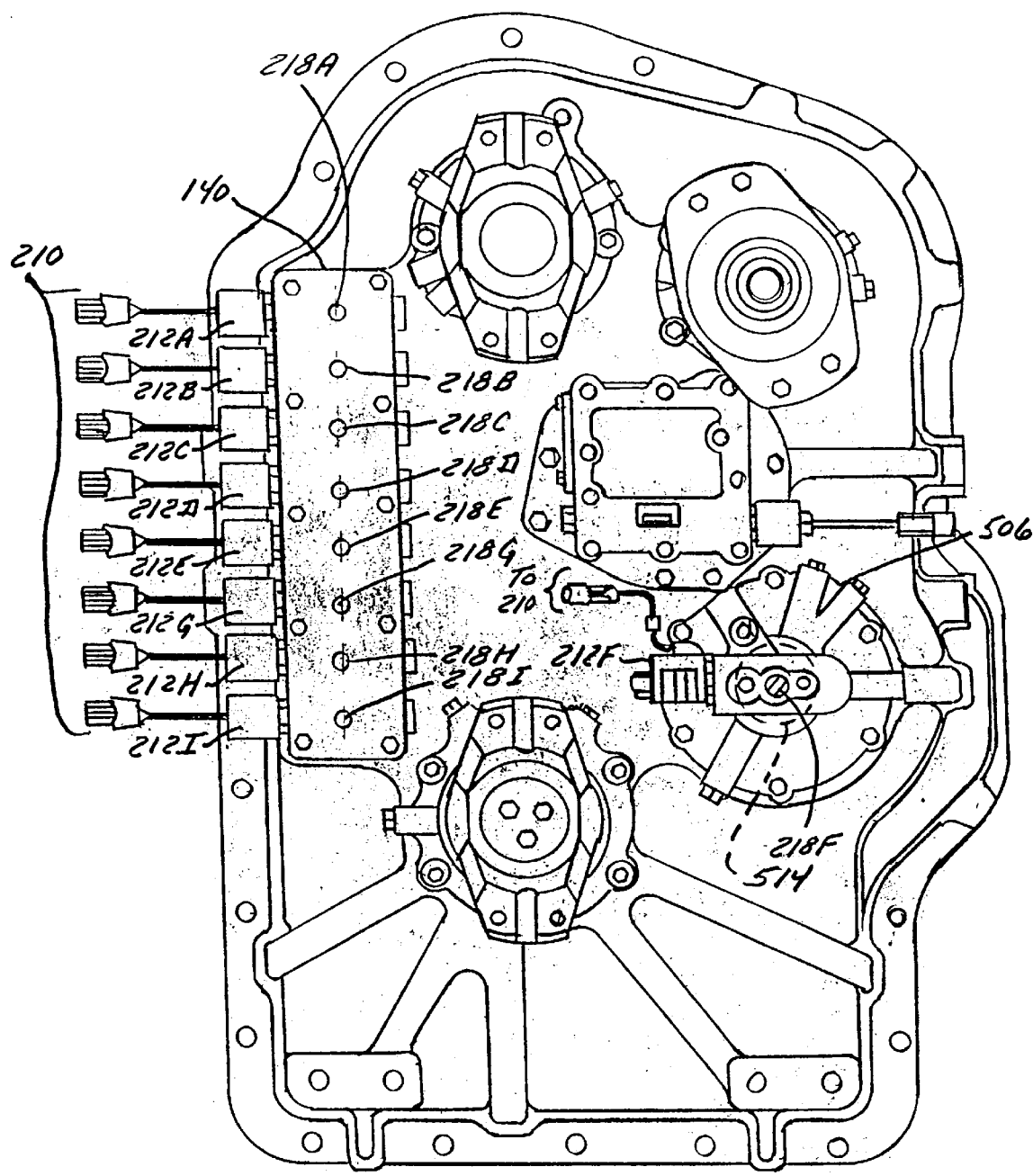
FIG. 6 is an end view of and alternative embodiment of the transmission of FIG. 1 showing the location of the clutch valve manifold and the various couplings to which the service tool is fluidly coupled to calibrate the clutches in the transmission wherein the couplings are located on the clutch manifold itself.

It may be difficult, however, for the operator or technician to easily reach each of these couplings 218A–I depending upon the space available around the transmission. For that reason, it may preferable to mount as many of the couplings 218A–I as possible on or near valve manifold 140, as shown in FIG. 6. FIG. 6 shows the same transmission as shown in FIG. 5 with a single difference. In the embodiment of FIG. 6, rather than locating couplings 218A–I on the bearing end caps, they are instead mounted to valve manifold 140 in close proximity to their corresponding valves 212A–I. Since valve 212F is not located on manifold 140, coupling 218F is disposed adjacent to it in end cap 506.

Figure 7:
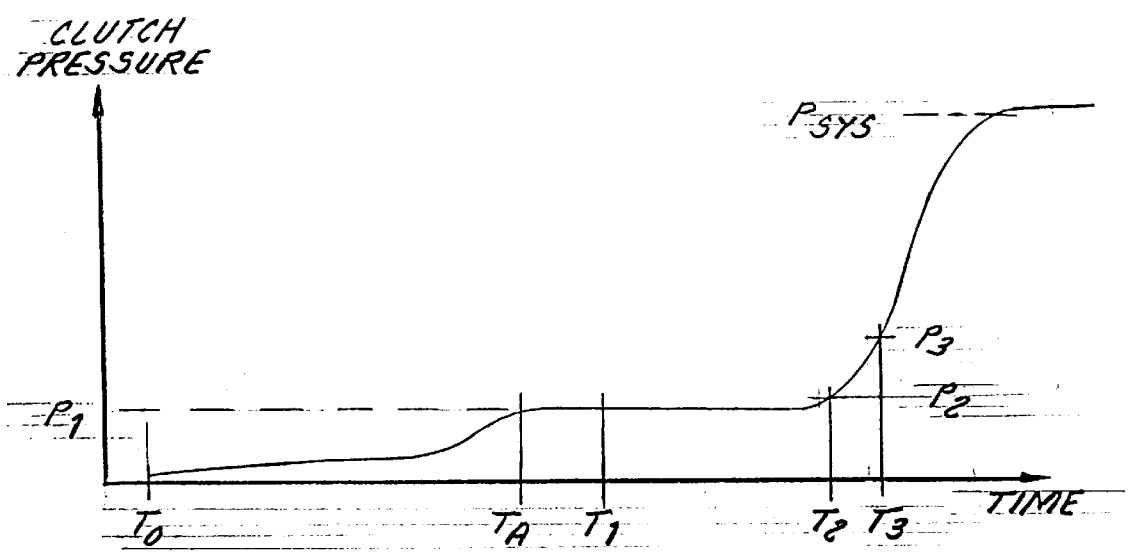
FIG. 7 is a graph of a typical pressure versus time clutch fill curve for the clutches in the transmission, indicative of the pressure in the clutches as the clutches are filled.

FIG. 7 illustrates a typical clutch pressure-versus-time curve for the filling of any of the clutches in transmission 110 and reflects the pressure indicated by transducer 226.

Time $T_0$ represents the time at which a clutch valve 212 is initially energized to open and provide fluid to its corresponding clutch. During an initial phase of clutch filling, shown as the time between $T_0$ and $T_a$, valve 212 opens, and the internal valve element (such as a spool) shifts to permit fluid flow. Fluid is initially introduced into the clutch through the corresponding shaft and slack in the clutch itself is initially removed.

By time $T_a$, the clutch has been initially filled, the slack taken out, and incoming fluid has just begun to press against springs in the clutch causing an initial pressure rise. Once hydraulic fluid begins acting against the internal springs of the clutch plates of the clutch begin to compress together during the period of time identified as that between $T_A$ and $T_2$. During this period of filling, the clutch plates are pressed closer together, but have not made solid contact with one another thereby permitting the communication of torque through the clutch and thereby locking the associated transmission gear on its associated shaft. At time $T_2$, however all the slack has been taken out of the clutch, and the clutch has been filled. The additional miniscule flow into the clutch no longer acts against the clutch springs compressing the plates together at pressure $P_1$. Additional fluid flowing to the clutch serves to rapidly increase the pressure as shown by the rapid increase between times $T_2$ and $T_3$. Eventually, the pressure in the clutch reaches $P_{sys}$, the system pressure provided by pump 216, and all additional flow to the clutch ceases.

Time $T_1$ is a period of approximately 160 milliseconds (in this embodiment) after $T_0$ at which time the pressure in the clutch has risen to a stable fill pressure, $P_1$, but has not completely filled. The time interval between $T_0$ and $T_2$ represents the fill time of the clutch. Pressure $P_3$ is approximately 20 PSI greater than the fill pressure $P_1$ during the calibration process, the pressure in the clutch is monitored until it reaches $P_3$, at which point the system determines that the clutch has definitely been filled.

Figure 8:
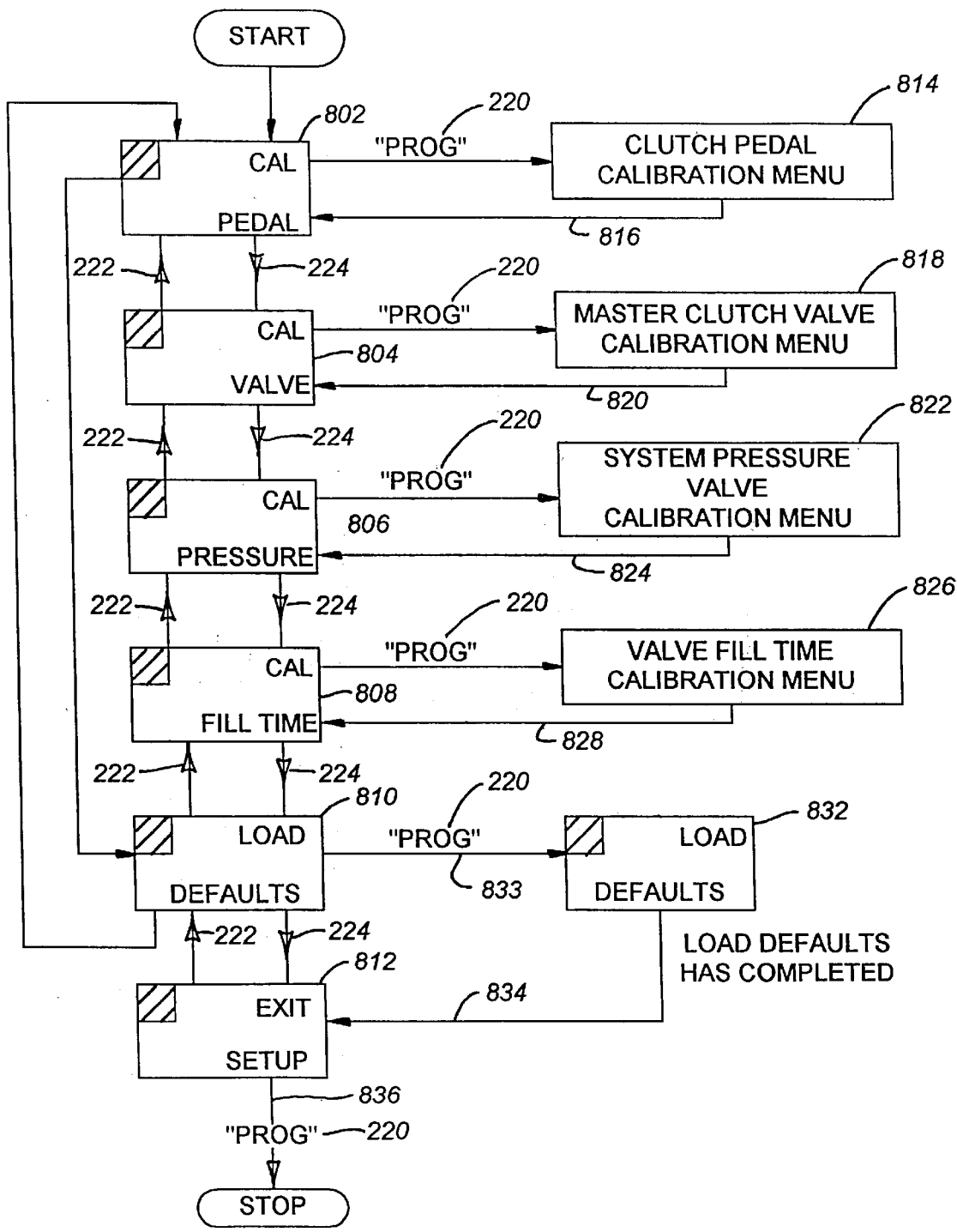
FIG. 8 is a flow chart showing the sequence of menus displayed by the Instrument Cluster Unit (ICU) on its display for calibration of several vehicle systems, including the main menu for clutch fill time calibration and indicating the steps in program operation executed by the ICU during calibration.

FIG. 8 illustrates a flow chart showing the sequence of computer-generated displays that appear on display 134 during the calibration process. Both ICU 122 and TRCU 124 are programmed to perform specific portions of the calibration process, as described below.

ICU 122 includes a microprocessor that follows a sequence of programmed instructions stored in the ROM memory of ICU 122 to generate a series of displays. These displays permit the operator to select, in conjunction with buttons 136, particular calibration activities to be performed by ICU 122 and/or TRCU 124. One of the calibration activities is clutch fill time calibration, the subject of the present application.

When the vehicle is turned on and power is applied to ICU 122, the operator is permitted to select calibration activities. Once the operator selects calibration using buttons 136, ICU 122 displays a series of calibration screens 802–812. If the operator selects clutch fill calibration in block 808, the ICU displays the screens shown in FIG. 9, which all relate to clutch fill time calibration. In addition, TRCU 124 performs the clutch fill time steps shown in FIG. 10.

The indicia "Prog" or an up or down arrow symbol superimposed on top of any arrow in FIG. 8 indicates that the user selects the function to which the arrow points by pressing the "Prog" button (switch 230 in the button array 136 in ICU 122) the up arrow button (switch 232 in array 136) or the down arrow button (switch 234 in array 136). By "user selecting the function" it is meant that ICU 122 performs the function indicated by the block to which the arrow points in response to pressing the "Prog" (230), up arrow (232) or down arrow (234) buttons. Thus, ICU 122 monitors several of the buttons of array 136, and depending upon which button is pressed is programmed to perform an associated function.

Referring back to FIG. 8, when the operator enters the calibration program by manipulating one of buttons 136, ICU 122 responsively causes display 134 appear as shown in block 802.

The indicia "Cal" in block 802 indicates to the operator that he is in the calibration menu. The indicia "Pedal" indicates that he can at this point select the clutch pedal calibration submenu 814.

If the user presses the "Prog" button he can perform the clutch pedal calibration routine as indicated by block 814. When the user has finished calibrating the clutch pedal, and exits the clutch pedal calibration routine, arrow 816 from item 814–802 indicates that the ICU 122 erases the clutch pedal calibration menu and replaces it with the display shown as item 802.

The operator can navigate using up and down buttons (232 and 234) shown in FIG. 8 as a small up arrows and small down arrows. The up arrow indicates what ICU 122 will do when button 232 of buttons 136 (FIG. 2) is pressed and the down arrow indicates what ICU 122 will do when button 234 of buttons 136 (FIG. 2) has been pressed.

Thus, when ICU 122 presents the indicia or menu shown in block 802 in display 124, the operator can replace these indicia with the indicia shown in item 804 by pressing the down arrow, button 234. The indicia shown in block 804 appear on display 134 when the user presses down arrow 234.

At this point, if the operator presses "Prog" button 230, ICU 122 then displays the master clutch valve calibration menu shown in FIG. 8 as block 818. Once the operator has calibrated the master clutch valve, and exits the master clutch valve calibration menu, arrow 820 indicates that ICU 122 is programmed to automatically erase display 134 and replace it with the indicia shown in block 804.

In a similar fashion the operator can then press down arrow button 234, which causes display 134 to display the indicia in block 806. Once displayed, the user can then press "Prog" button 230 to enter the system pressure valve calibration menu shown as block 822 in FIG. 8.

Similarly, once the operator has finished calibrating the system pressure valve and exits the system pressure valve calibration menu 822 ICU 122 is configured to erase display 134 and replace it with the indicia shown on block 806 as indicated by arrow 824.

Again, the operator can press down arrow button 234 and the display 134 will be erased by ICU 122 and replaced with the indicia shown in block 808. If the user then selects "Prog" button 230, ICU 122 displays the valve fill time calibration menu identified as block 826 in FIG. 8.

On exiting the valve fill time calibration routine access to the valve fill time calibration menu ICU 122 is configured to erase the display 134 and replace the valve fill time calibration menu indicia with the indicia shown in block 808, as indicated by arrow 828.

Similarly, when display 134 is displaying the indicia shown in block 808 the operator can press down arrow button 234 and ICU 122 will respond by displaying the indicia shown in block 810. Should the operator choose to load the default values for the clutch pedal, the master clutch valve, the system pressure valve, and the valve fill times, he can press "Prog" button 230 as indicated by arrow 830.

The display 134 will not change when he presses "Prog" button 230, however, as shown by block 832, which is the same as block 810. Nonetheless, ICU 122 will read and stores these default values as the working operational values in ICU 122 and TRCU 124.

Once the programmed values have been replaced with the default values in the electronic memory of ICU 122 and TRCU 124, ICU 122 is programmed to automatically display the indicia shown in block 812 as indicated by arrow 834.

Alternatively, when ICU 122 is displaying the indicia in block 810 on display 134, if the user wishes to save the newly calibrated values generated in each of the foregoing calibration submenus, he can press down arrow 234. At this point, ICU 122 will erase display 134 and replace it with the indicia shown in block 812. To then exit the calibration menus and return the vehicle to normal operation, the operator can press "Prog" button 230 as shown by arrow 836.

The operator need not perform all the calibration processes indicated by blocks 814, 818, 822, 826, and 832, however. By using up arrow button 232 and down arrow button 234 the operator can skip any or all of these steps in the total calibration process.

For example, when ICU 122 displays the indicia in block 802 the operator can press the down arrow to display the indicia in block 804, press the down arrow to display the indicia shown in block 806, press the down arrow to display the indicia shown in block 808, press the down arrow to display the indicia shown in block 810, and press the down arrow to display the indicia in shown in block 812.

The operator can also navigate "upwards" (as shown in FIG. 8) between any of these displays by pressing up arrow button 232. The operator can therefore perform any calibration process in any order or perform no calibration processes at all as he chooses.

Figure 9:
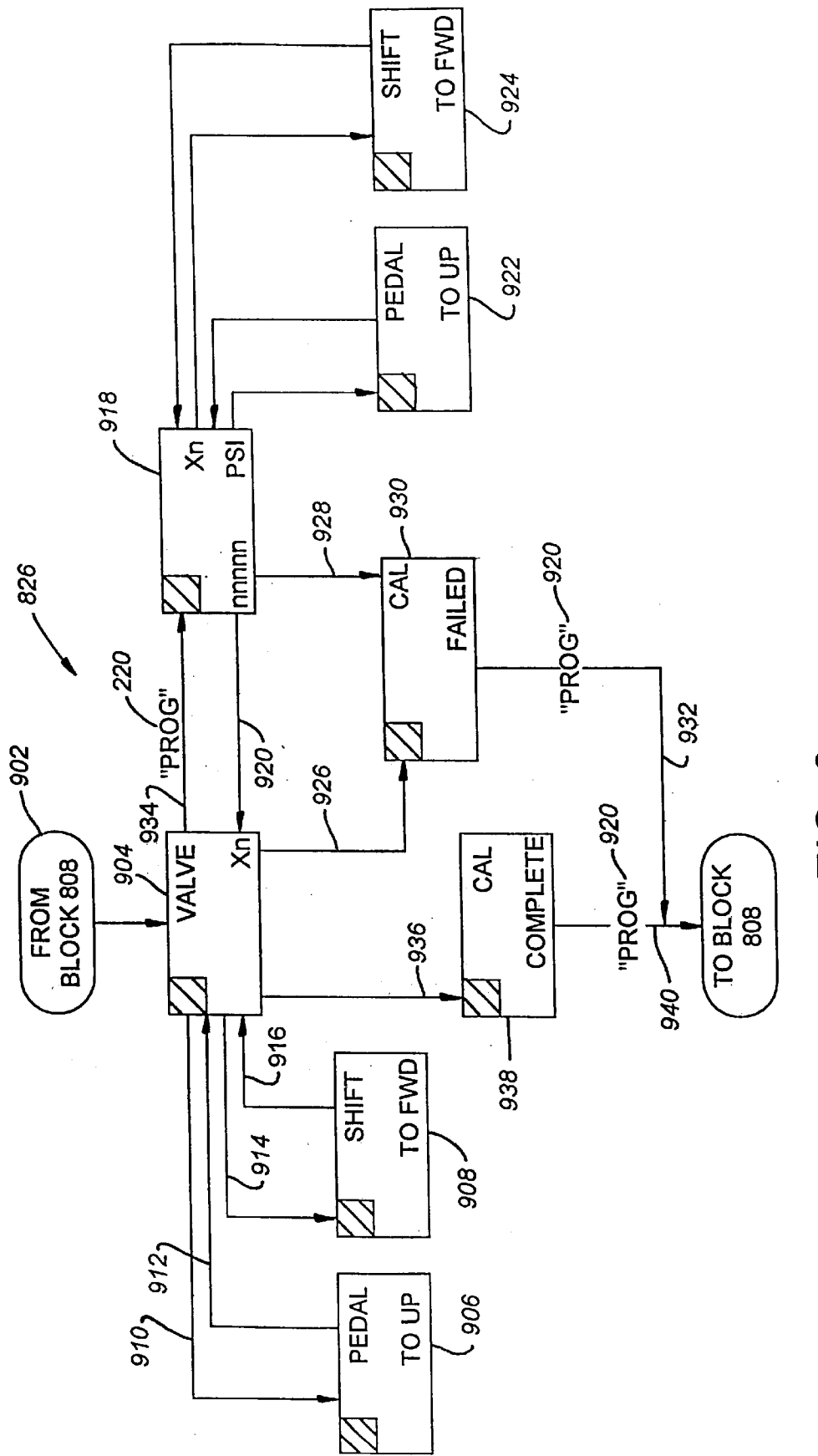
FIG. 9 is a flow chart showing the sequence of menus displayed by the ICU on its display for calibrating each of the clutches of the transmission and indicating the steps in program operation executed by the ICU during calibration.

FIG. 9 illustrates the sequence of clutch fill time calibration menus and the way the user navigates between them. They are collectively shown in FIG. 8 as block 826: the "valve fill time calibration menu".

As described above, when ICU 122 displays the indicia of block 808 on display 134 the operator, by pressing "Prog" button 230, can enter the valve fill time calibration menus shown by block 826. This entry point is indicated in FIG. 9 by block 902.

ICU 122 first displays the indicia shown in block 904. The word "Valve" indicates to the operator that he is in a clutch valve calibration submenu. The indicia "Xn" tells the operator which of the clutches he is calibrating. The character "X" stands for the number of the shaft on which the clutch being tested is mounted. In the present embodiment, the transmission has five shafts, shafts 1–5, of which four have clutches. Each shaft may have up to three clutches, a front ("F"), a middle ("M"), or a rear ("R"), clutch. Not all shafts have three clutches, however.

During actual calibration, the letter "n" in block 904 is replaced with a letter indicative of the location of the clutch on the shaft (either "F", "M", or "R") that is currently selected for calibration. Thus, as the fill time of each clutch is successively calibrated, starting with the first clutch, the indicia "Xn" in block 904 will actually appear to the operator as "1F", "1M", "1R", "2F", "2R", "4F", "4R", "5F", and "5R" in turn. In this manner, the indicia on the display indicate the shaft on which the clutch is mounted as well as the location of the clutch on that shaft.

It should be clear that the process of displaying indicia indicative of the particular clutch valve that is currently being calibrated is not limited to a transmission having 9 clutches but is equally applicable to a clutch calibration process for any number of transmission clutches.

Once the indicia of block 904 are displayed, ICU 122 checks certain vehicle parameters and displays certain associated warning messages before it begins the calibration process. These warning messages (indicated by blocks 906 and 908) are generated in response to packetized data sent from TRCU 124 to ICU 122 over the serial communications link 204 (FIGS. 2, 4).

Referring now to FIGS. 2 and 4, TRCU 124 is coupled to bottom of clutch switch 202 and the forward, neutral, reverse, and park switches in pod 138. TRCU 124 continually checks these switches at intervals of about ten milliseconds. It provides this data in packet form through serial communication circuit 208 to serial communications line 204. Thus, ICU 122 is continually updated regarding status of these switches—whether they are open or closed.

Referring back to FIG. 9, after displaying the indicia in block 904, ICU 122 examines the packetized data indicative of the clutch pedal position and the forward switch position. If the data it has received from TRCU 124 indicates that bottom-of-clutch switch 200 is engaged (i.e. the clutch pedal is completely depressed) ICU 122 automatically displays the indicia shown in block 906. These indicia direct the operator to release the clutch. Once the clutch has been released and ICU 122 receives the packet of data from TRCU 124 indicating that the clutch has been released, ICU 122 automatically erases the indicia in block 906 and replaces it with indicia in block 904. This process is indicated by arrows 910 and 912.

In a similar fashion ICU 122 examines the packetized data it has received from TRCU 124 and checks to see whether shift lever 126 is in the "forward" position. In other words, whether the forward switch in pod 138 is closed. If the packetized data received from TRCU 124 indicates to ICU 122 that the shift lever 126 is not in forward, ICU 122 erases the indicia in block 904 from display 134 and replaces it with indicia shown in block 908. As in the case of the clutch pedal, any further activity is prevented until the operator shifts the shift lever 126 to forward. This programmed operation is indicated by arrows 914 and 916 in FIG. 9.

With the clutch released and the shift lever in forward, ICU 122 displays the indicia shown in block 904. However, should either the bottom-of-clutch switch or the forward switch be changed, ICU 122 will immediately erase the indicia of block 904 and again replace them with the indicia in block 906 or 908.

At this point, and if the operator has not done so prior to this time, the operator attaches service tool connector 222 to connector 220 coupled to TRCU 124. In this manner, an electrical connection is provided between TRCU 124 and pressure transducer 226. Pressure transducer 226 is electrically energized by the connection to TRCU 124 and provides TRCU 124 with an electrical signal indicative of the pressure acting on pressure transducer 226 over wire loom 224.

In a similar fashion, the operator manually connects pressure transducer coupling 228 to the fluid coupling 218 that is fluidly coupled to the clutch shown on display 134 (i.e. the "n" in "Xn" in block 904). Once this electrical connection between pressure transducer 226 and TRCU 124 is made and the mechanical and fluid connection between coupling 228 and coupling 218 is made, calibration can commence.

When the user has made the above connections of the service tool 202 to TRCU 124 and to transmission 110, he presses "Prog" button 230. On receiving the electrical signal from the "Prog" button indicating that the "Prog" button has been pressed, ICU 122 erases display 134 and displays the indicia shown in block 916. The indicia "Xn" actually appears with the letter "n" with the number representing the clutch that the operator is calibrating. The indicia "nnnn" in block 918 does not appear as letters "n" but as the actual pressure measured at pressure transducer 226. In this manner, the operator sees on display 134 an indicia indicating both the particular clutch being calibrated and the pressure in that clutch as measured at pressure transducer 226. The actual calibration is performed by TRCU 124 and is described below in conjunction with FIG. 10. Once the clutch is calibrated, ICU 122 erases the indicia shown in block 918 and replaces it with the indicia shown in block 904. This is indicated in FIG. 9 by arrow 920.

As each clutch is calibrated successfully, ICU 122 displays indicia representative of the next clutch to be calibrated in this process. If the first clutch was identified as "X1", for example, the next clutch to be calibrated is displayed as "X2". These particular indicia are just examples, however, and any indicia sufficient to identify to the operator which clutch is going to be calibrated would be sufficient. For example, the indicia might indicated not only the clutch, but the shaft on which it is mounted: the forward clutch on the first shaft might be indicated as "F1" and the rear clutch on the third shaft might be indicated a "R3", for example.

While TRCU 124 calibrates the clutch and ICU 122 displays the indicia shown in block 918 on display 134, ICU 122 also checks the state of the bottom of clutch switch and the forward switch in the same manner as described above.

If at any point during the calibration process of any of the clutches the clutch pedal is depressed, thereby switching bottom-of-clutch switch 130, or shift lever 126 is moved out of forward, ICU 122 is programmed to halt the calibration process of the clutch. Once the calibration process is halted, ICU 122 commands display 134 to show the clutch pedal or shift lever warning indicia shown in blocks 922 and 924. Calibration of the clutch will be halted until the operator again releases the clutch and shifts shift lever 126 back to forward. Once this is done, ICU 122 will again display the indicia shown in block 918 and the clutch calibration process for the selected clutch will begin all over again.

On occasion, the clutch calibration may fail. "Failure" in this context may mean any of several things. First, if the pressure in the clutch never rises to an acceptable level such as 20 psi, for example. Second, if the vehicle moves, as indicated by a shaft sensor on the drive shafts, axles, or transmission output shaft. Third, if a valve error is detected. Fourth, if the pressure sensor fails. Fifth, of the hydraulic fluid pressure provided to the transmission is out of range, for example, greater than 300 psi or less than 100 psi. Sixth, if the clutch is not filled (described below) within a predetermined period of time, for example, within 350 milliseconds of $T_0$.

Whenever any of these error conditions occur, as shown by arrows 926 and 928, ICU 122 halts the calibration process by deenergizing the valve controlling the clutch being calibrated, thereby permitting the clutch to disengage. ICU 122 also displays the indicia shown in block 930. The word "Fail" in block 930 indicates to the operator that the calibration process failed. This indicia stays on the screen until the operator presses the "Prog" button 220 as indicated by arrow 932.

The operator must take action as each clutch is in turn calibrated. When ICU 122 displays the indicia of 904 with the indicia "Xn" ("n" being replaced with the indicia indicating the next valve to be calibrated) this informs the operator that he must move service tool 202 to fluidly connect the pressure transducer 226 to the new clutch to be calibrated.

The operator disconnects coupling 228 (and hence pressure transducer 226) from fluid coupling 218 of the clutch that was just calibrated. The operator then attaches coupling 228 and pressure transducer 226 to coupling 218 associated with the clutch identified by the new "Xn" indicia in block 904 (FIG. 9). Once this connection is made, the operator presses the "Prog." button 220 as indicated by arrow 934, and TRCU 124 calibrates the clutch.

This process of sequentially prompting the operator with indicia indicating each new clutch to be calibrated in block 904 is repeated for all the clutches that are calibrated. This is the primary reason for providing the operator with clutch indicia in block 904.

Once ICU 122 determines that all the clutches have been calibrated, it exits the calibration process as shown by arrow 936 and displays the indicia shown in block 938 the word "Complete" indicates to the operator that all clutches have been calibrated successfully and the calibration process is over.

At this point the operator can press "Prog" button 220 as indicated by arrow 940 and ICU 122 exits the valve fill time calibration process. Referring back to FIG. 8, this return from the calibration process is indicated by arrow 828.

During the entire calibration process, it should be clear that ICU 122 continuously checks two system status parameters, namely the position of the clutch pedal (i.e. the bottom of clutch switch) and the position of the shift lever (i.e. the forward switch). At any time during this calibration process as ICU 122 goes from block 904 to 918, if the pedal is depressed or the shift lever is moved from the forward position, the calibration process is halted until the operator returns the pedal and shift lever to the desired positions.

Note that checking the clutch pedal and shift lever positions are not important in and of themselves. Due to the specific circuitry used to operate the particular vehicle shown in FIG. 1, it is important that the clutch and shift lever be in the desired positions during the entire calibration process.

Other vehicle operational parameters such as hydraulic system pressure, engine speed, or other vehicle parameters may be important in other vehicles, and thus other vehicle parameters may be monitored by TRCU 124 and used to abort calibration.

Figure 10:
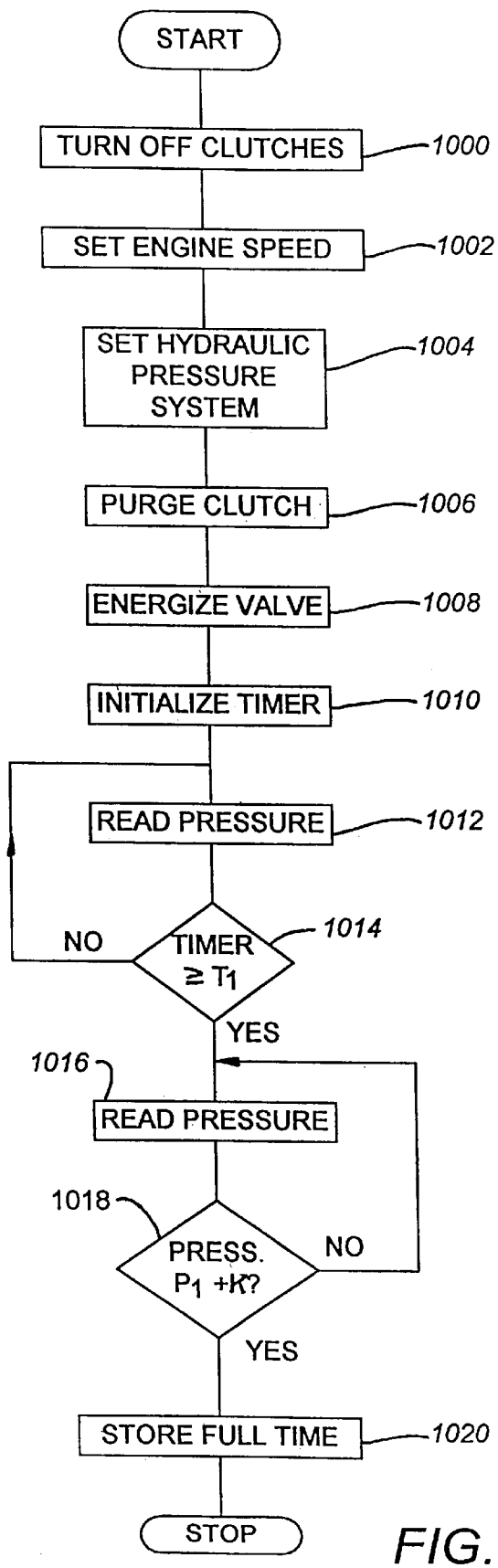
FIG. 10 is a flow chart indicating the programmed steps performed by the Transmission Control Unit (TRCU) during calibration of each of the clutches of the transmission.

The clutch calibration process itself is shown in FIG. 10. FIG. 10 is a flow chart of the process which ICU 122 and TRCU 124 perform as each clutch in turn is calibrated.

First, ICU 122 signals TRCU 124 over serial communications line 204 to turn off all transmission clutches, as shown by block 1000 in FIG. 10.

ICU 122 then commands TRCU 124 to set the engine speed to a predetermined value, preferably 1600 rpm as shown in block 1002 in FIG. 10.

ICU 122 then commands TRCU 124 to set the hydraulic fluid system pressure to a predetermined value preferably about 160 psi as shown in block 1004. In this manner, the vehicles return to a known state with known operating parameters prior to the calibration of each clutch.

Once the hydraulic system pressure has been set, ICU 122 commands TRCU 124 to purge or cycle the clutch as shown in block 1006. This clutch purging process serves to reduce the amount of air or vapor in the clutch or clutch valve as well as to lubricate the clutch components and circulate hydraulic fluid through them prior to calibration. By doing this, the clutch components are loosened, lubricated and warmed to more closely approximate the true operating conditions of the clutch. By doing this, any measurement of clutch fill times will more accurately represent the true clutch fill times experienced by the clutch during normal operation in the field.

To cycle a clutch, TRCU 124 repeatedly engages and disengages the clutch causing it to be repeatedly filled and emptied of hydraulic fluid. TRCU 124 does this by energizing clutch valve driver circuit 210, which in turn opens clutch valve 212 for the clutch being calibrated. The valve is energized for a predetermined period of time, preferably a period sufficient to fill the clutch with hydraulic fluid and to raise it to system pressure. In the preferred embodiment, this is about one second.

Once this time has elapsed, TRCU 124 de-energizes the clutch valve driver circuit 210, which de-energizes the associated clutch valve 212 and thereby permits fluid to escape the clutch to be calibrated. This state is also maintained for a predetermined period of time, preferably sufficient to permit the clutch to be completely disengaged and emptied of fluid. In the preferred embodiment this is about one second.

TRCU 124 again energizes clutch valve driver circuit 210 opening clutch valve 212 and again filling the clutch to be calibrated. Again, this state is maintained for a predetermined period of time of about one second.

Finally, TRCU 124 de-energizes clutch valve driver circuit 210 which de-energizes clutch valve 212 and permits the clutch to again empty.

To ensure that the clutch is completely emptied and ready for calibration, TRCU 124 then waits for a predetermined period of time. This period is preferably around six seconds.

At this point, the cycling or purging process of block 1006 is complete and the measurement of clutch fill time can start.

To determine the clutch fill time, TRCU 124 energizes the clutch valve via driver circuit 210 and initializes an internal timer called the "fill time calibration timer." This is shown in FIG. 10 as blocks 1008 and 1010.

Once the timer has been initialized, TRCU 124 begins reading the pressure in pressure transducer 226 as indicated by block 1012. TRCU 124 checks the calibration timer periodically to determine whether the timer has reached a predetermined time value. This predetermined time value (shown in FIG. 7 as the difference between time $T_0$ and $T_1$) is empirically determined for each vehicle and/or clutch and is stored in the electronic memory of TRCU 124. It reflects the time at which the initial fill period has completed and the pressure has stabilized at a stable fill pressure $P_1$. See FIG. 7.

The length of the time interval will vary from vehicle to vehicle depending upon the construction and capacity of the clutch, the size of the conduits, the fluid flow rate to the valve and clutch, and the system pressure that is applied. A change in any of these will vary the point $T_a$ at which the fill pressure stabilizes and the springs of the clutch begin to compress. In the preferred embodiment, $T_1$ is approximately 160 milliseconds. This checking of the timer is illustrated in FIG. 10 as block 1014.

Once the timer has reached time $T_1$, (FIG. 7) the early fluctuations in pressure (shown as slightly prior to time $T_a$) have passed and any further significant increases in pressure to the clutch being filled. By delaying for a predetermined initial period, the system is configured to avoid false pressure fluctuations that are not indicative of clutch filling. TRCU saves the pressure measured at time $T_1$ (i.e. pressure $P_1$) and saves it for future use in the calibration process. This pressure is called the stabilized clutch fill pressure.

After it stores pressure $P_1$, TRCU 124 again reads the clutch pressure as indicated by block 1016 in FIG. 10.

In block 1018, TRCU 124 compares this latest measured pressure with a predetermined higher pressure indicative of the clutch having been filled. This is shown in block 1018 of FIG. 10. The pressure is examined by TRCU 124 to determine whether it is greater than the stabilized fill pressure $P_1$ by a predetermined amount "K". In the particular embodiment described herein, K is 20 psi. The value of K is selected such that it is only reached when the clutch has filled.

If the pressure measured in step 1016 is less than $P_1+K$, TRCU 124 returns to step 1016 and repeats the process of steps 1016 and 1018. Once the pressure is greater than $P_1+K$, TRCU 124 then stores a time value indicative of the time required to fill the clutch, as shown in block 1020.

As shown in FIG. 7, this pressure $P_1+K$ is pressure $P_3$ at time $T_3$. The difference in time between $T_0$ and $T_3$ is therefore the calibrated clutch fill time for that clutch.

For many applications, determining the fill time at a point 20 psi above the stabilized fill pressure may be sufficient. For a more accurate measurement, TRCU 124 may be programmed to compensate for the amount of time between the actual moment of clutch filling, $T_2$, and the moment at which the pressure rose by the predetermined amount, K. To do this, TRCU 124 may be programmed to subtract a predetermined amount of time.

For example, and using the example of FIG. 7, time $T_2$ is a more accurate representation of the clutch fill time than time $T_3$. At time $T_2$, the pressure has started rising, although not substantially, indicating that the clutch has been filled. It may be impossible to measure the slight difference in pressure between $P_2$ and $P_1$, however, due to noise in the signal from transducer 226. Hence, TRCU 124 is configured to wait until the pressure has risen substantially (i.e. to $P_3$ at time $T_3$) before determining that the clutch has been filled.

Subtracting a predetermined time interval, such as the interval between time $T_2$ and time $T_3$ and using the time interval $T_0$ to $T_2$ as the true fill time will thereby provide a more accurate representation of the fill time. For this reason, TRCU 124 is preferably configured to subtract a predetermined time interval, in this embodiment 30 milliseconds, the time difference between $T_3$ and $T_2$, to generate a corrected or revised fill time equal to $T_2$ minus $T_0$. It is this time interval that is stored as the clutch fill time in step 1020. The difference between time $T_2$ and time $T_3$ may be empirically determined for any vehicle by using a more accurate pressure transducer during design of the vehicle. It may be different for each clutch, and hence, in addition to each clutch having its own fill time in the electronic memory of TRCU 124, each clutch may also have its own predetermined correction factor (i.e. $T_3$ minus $T_2$) stored in TRCU 124 to be used by TRCU 124 to correct the raw clutch fill time.

The steps described above in conjunction with the flow chart of FIG. 10 are repeated for each clutch as each clutch is calibrated. These steps are performed by TRCU 124 while ICU 122 displays the indicia shown in block 918. In addition, TRCU 124 sends the clutch pressure measured by transducer 226 over the serial communications link in packet form to ICU 122 as the calibration process occurs. It is this pressure that ICU 122 places on display 134 as shown in block 918 as "nnnn".

Figure 11:
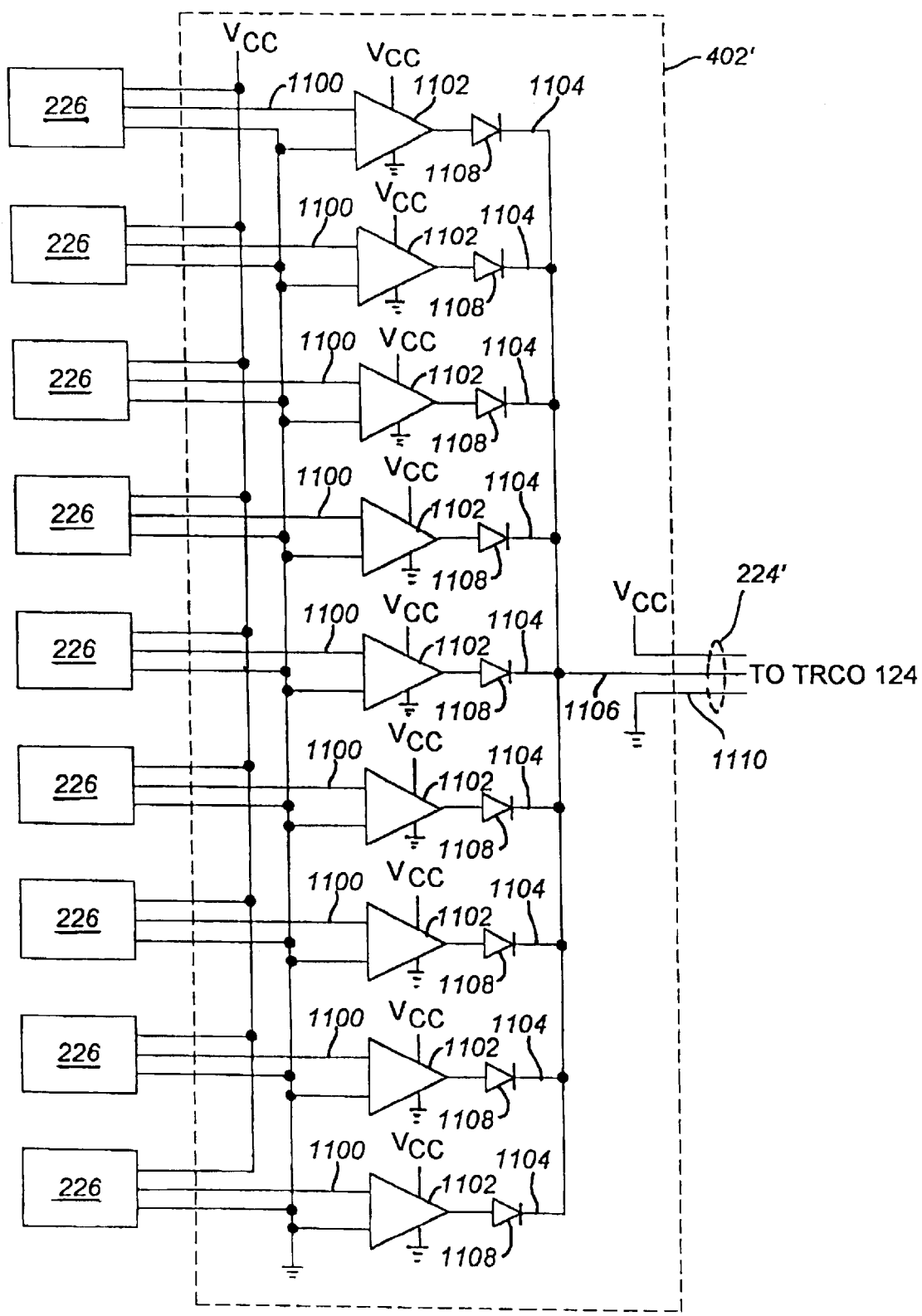
FIG. 11 is a schematic representation of an alternate service tool that automatically couples the appropriate pressure transducer to the Transmission Control Unit.

FIG. 11 shows a schematic diagram of an alternative switch box 402' that is usable in place of switch box 402 shown in FIG. 4. In this switch box, the output line 1100 of each pressure transducer 226 is coupled to a corresponding operational amplifier 1102. Operational amplifiers 1102 amplify the electrical pressure signal generated by the pressure transducer that appears on output line 1104. The outputs 1104 of operational amplifiers 1102 are coupled together to a common signal return line 1106 that is a part of wire loom 224' extending between the switch box and TRCU 124. A diode 1108 is disposed between each operational amplifier and the common node to which they are all connected. The diode prevents one amplifier from driving another in the even of a transducer or amplifier failure that could cause overheating and damage.

Power for the switch box op amps 1102 and transducers 226 is provided by TRCU 124 via a supply voltage line "Vcc" and a ground line 1110 that extend from TRCU 124 and switch box 402'. These lines are coupled to both the op amps 1102 and the transducers 226 to provide both of them with power.

A primary advantage to switch box 402' is that it automatically connects the output of each pressure transducer 226 to TRCU 124. An additional advantage is that it eliminates the need for the operator to manually switch from transducer to transducer as is required by switch box 402. Since TRCU 124 energizes only one clutch at a time, only one pressure transducer 226 at a time generates a signal indicative of an elevated pressure.

In this embodiment, the preferred pressure transducers 226 are Texas Instruments model number 2CP32-1. As pressure is applied to these transducers, they generate an output voltage on their output signal lines 1100 that increases from a zero pressure voltage of about 0.5 volts to a maximum pressure voltage of about 4.5 volts.

As each clutch is filled with fluid, only one pressure transducer—the one associated with that clutch—will generate an increased voltage on its output signal line 1100. This elevated voltage indicative of an increased pressure is amplified by the op amp 1102 to which it is coupled, the output 1104 of which is automatically applied to line 1106 which carries it to TRCU 124.

While the one op amp is generating its elevated voltage, the remaining op amps 1102 receive the zero voltage signal of only about 0.5 volts from their respective pressure transducers 226. These voltages are below the voltage of the op amp for the clutch being calibrated. Diodes 1108 on each of the lower voltage op amps 1102 prevent the op amp 1102 that is experiencing the elevated pressure signal and is therefore generating a higher voltage indicative of the elevated pressure signal from driving all the other op amps. In this manner, the op amp and transducer pair that is experiencing the higher pressure predominates and are automatically coupled to TRCU 124 to provide a clutch pressure signal.

Since each of the pressure transducers 226 are automatically connected to TRCU 124 when they experience an elevated pressure, TRCU 124 does not need to wait for the operator to switch a switchbox, and hence does not need to wait for the operator to press the "Prog" button to go from block 904 and block 918 (see FIG. 9) during the calibration process. In the preferred embodiment the TRCU will continue to wait for the operator to press the "Prog" key to transition from block 904 to block 914 to provide the operator with some indication of the state of the calibration process. In an alternative embodiment, however, TRCU 124 is programmed not to wait for operator input between successive clutch calibrations, but to automatically sequence through each of the clutches, calibrating each one in turn.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method for calibrating hydraulic clutches in a powershift transmission of a work vehicle, comprising the steps of:

manually connecting a pressure transducer to a first hydraulic fluid conduit extending between a first clutch control valve and a first clutch in the powershift transmission such that the pressure transducer generates an electronic pressure signal indicative of the fluid pressure in the first clutch;

manually connecting the pressure transducer to an electronic transmission controller on the vehicle, wherein the electronic transmission controller is configured to drive the pressure transducer and to receive the electronic pressure signal;

electronically signaling the first clutch valve to fill the first clutch with hydraulic fluid;

electronically monitoring the time required to fill the first clutch;

determining that the digital value indicative of a current clutch pressure signal is greater than the digital value indicative of at least one past dutch pressure signal by a predetermined pressure difference;

recording a digital value indicative of the time required to fill the first clutch in an electronic memory of the electronic transmission controller, manually disconnecting the first pressure transducer from the first conduit; and manually disconnecting the first pressure transducer from the electronic transmission controller, wherein the step of manually connecting to a first conduit includes the step of fluidly coupling the first pressure transducer to a quick-connect coupling mounted on the transmission, wherein the pressure transducer is electrically connected to a first electrical connector such that the transducer and connector together define a removable and replaceable structure and further wherein the step of connecting to the controller includes the step of coupling the first electrical connector to a mating electrical connector on the work vehicle, wherein the mating electrical connector is electrical coupled to the electronic transmission controller, wherein the step of electronically monitoring includes the step of comparing a digital value indicative of a current clutch pressure signal provided by the pressure transducer with a digital value indicative of at least one past clutch pressure signal provided by the pressure transducer, wherein the step of comparing includes the step of determining that the digital value indicative of a current clutch pressure signal is greater than the digital value indicative of at least one past clutch pressure signal by a predetermined pressure difference, and wherein the step of electronically storing includes the steps of:
      calculating a digital elapsed time value in the electronic transmission controller indicative of the elapsed time from the step of electronically signaling to the time of the step of determining; and
      saving the digital elapsed time value in the electronic transmission controller, the method further comprising the step of subtracting a predetermined time interval from the digital elapsed time value to generate a reduced digital elapsed time value, and saving the reduced digital elapsed time value in the electronic transmission controller.

2. A method for calibrating hydraulic clutches in a powershift transmission of a work vehicle, comprising the steps of:

manually connecting a pressure transducer to a first hydraulic fluid conduit extending between a first clutch control valve and a first clutch in the powershift transmission such that the pressure transducer generates an electronic pressure signal indicative of the fluid pressure in the first clutch;

manually connecting the pressure transducer to an electronic transmission controller on the vehicle, wherein the electronic transmission controller is configured to drive the pressure transducer and to receive the electronic pressure signal;

electronically signaling the first clutch valve to fill the first clutch with hydraulic fluid;

electronically monitoring the time required to fill the first clutch;

recording a digital value indicative of the time required to fill the first clutch in an electronic memory of the electronic transmission controller;

manually disconnecting the first pressure transducer from the first conduit;

manually disconnecting the first pressure transducer from the electronic transmission controller; and purging the first clutch, prior to the step of electronically signaling the first clutch valve, by electronically energizing, then deenergizing, then energizing, and then deenergizing the solenoid of the first clutch valve.

3. A method for calibrating hydraulic clutches in a powershift transmission of a work vehicle, comprising the steps of:

manually connecting a pressure transducer to a first hydraulic fluid conduit extending between a first clutch control valve and a first clutch in the powershift transmission such that the pressure transducer generates an electronic pressure signal indicative of the fluid pressure in the first clutch;

manually connecting the pressure transducer to an electronic transmission controller on the vehicle, wherein the electronic transmission controller is configured to drive the pressure transducer and to receive the electronic pressure signal;

electronically signaling the first clutch valve to fill the first clutch with hydraulic fluid;

electronically monitoring the time required to fill the first clutch;

recording a digital value indicative of the time required to fill the first clutch in an electronic memory of the electronic transmission controller;

manually disconnecting the first pressure transducer from the first conduit; and manually disconnecting the first pressure transducer from the electronic transmission controller;

wherein the step of electronically monitoring includes the steps of:
      waiting a predetermined time interval for a fill pressure of the first clutch to stabilize;
      recording a digital value indicative of the stabilized fill pressure;
      reading a new pressure signal from the first pressure transducer;

comparing the stabilized fill pressure with the new pressure signal; and repeating the steps of reading a new pressure signal and comparing the stabilized fill pressure until the new pressure signal exceeds the stabilized fill pressure signal by a predetermined pressure difference.

4. A method of calibrating a plurality of clutches in a powershift transmission with a pressure transducer, comprising the steps of:

manually connecting a pressure transducer to a first hydraulic conduit that extends from a first clutch control valve to a first hydraulic clutch in the transmission to provide an electronic pressure signal indicative of the fluid pressure in the first clutch;

manually connecting the pressure transducer to an electronic transmission controller on the vehicle, wherein the electronic transmission controller is configured to receive the pressure signal;

electronically signaling the first clutch valve in a clutch valve manifold to fill the first clutch with hydraulic fluid;

electronically monitoring the time required to fill the first clutch;

recording a first digital value indicative of the time required to fill the first clutch in an electronic memory of the electronic transmission controller;

manually disconnecting the pressure transducer from the first hydraulic conduit;

manually connecting the pressure transducer to a second hydraulic conduit that extends from a second clutch control valve to a second hydraulic clutch in the transmission to generate an electronic pressure signal indicative of the fluid pressure in the second clutch;

electronically signaling the second clutch valve in the clutch valve manifold to fill the second clutch with hydraulic fluid;

electronically monitoring the time required to fill the second clutch;

recording a second digital value indicative of the time required to fill the second clutch in the electronic memory of the electronic transmission controller;

manually disconnecting the pressure transducer from the second hydraulic conduit; and manually disconnecting the pressure transducer from the electronic transmission controller, wherein the steps of manually connecting include the step of fixing the pressure transducer to quick-connect couplings, and wherein the steps of manually disconnecting includes the step of removing the pressure transducer from the quick-connect couplings, and wherein the step of electronically signaling the first clutch valve includes the step of manually signaling the electronic transmission controller that the pressure transducer is fluidly coupled to the first clutch, and wherein the step of electronically signaling the second clutch valve includes the step of manually signaling the electronic transmission controller that the pressure transducer is fluidly coupled to the second clutch.

5. A method of automatically calibrating the fill time of a plurality of hydraulic clutches in a powershift transmission of a work vehicle using a test instrument comprised of at least first and second electronic pressure transducers electrically coupled to the inputs of a switch box, the switch box having an electrical output switchably connectable to at least the first and second pressure transducers, the method comprising the steps of:

fluidly connecting the first transducer to a hydraulic fluid supply line of a first hydraulic clutch of the plurality of clutches;

fluidly connecting the second transducer to a hydraulic fluid supply line of second hydraulic clutch of the plurality of clutches;

coupling the output of the switch box to an electronic controller of the work vehicle;

selecting the first pressure transducer at the switch box to thereby electrically couple the first pressure transducer to the electronic controller;

manually indicating to the electronic controller that the first transducer has been selected;

electronically determining the fill time of the first clutch using the first transducer;

selecting the second pressure transducer at the switch box to thereby electrically couple the second pressure transducer to the electronic controller;

manually indicating to the electronic controller that the second transducer has been selected; and electronically determining the fill time of the second clutch using the second transducer.

6. The method of claim 5, wherein the step of fluidly connecting the first pressure transducer includes the step of connecting the first pressure transducer to a first quick-connect coupling.

7. The method of claim 6, wherein the step of fluidly connecting the second pressure transducer includes the step of connecting the second pressure transducer to a second quick-connect coupling.

8. A method for calibrating hydraulic clutches in a powershift transmission of a work vehicle, comprising the steps of:

manually connecting a first pressure transducer to a first hydraulic fluid conduit extending between a first clutch control valve and a first clutch in the powershift transmission such that the pressure transducer generates an electronic pressure signal indicative of the fluid pressure in the first clutch;

manually connecting the pressure transducer to an electronic transmission controller on the vehicle, wherein the electronic transmission controller is configured to drive the pressure transducer and to receive the electronic pressure signal;

electronically signaling the first clutch valve to fill the first clutch with hydraulic fluid;

electronically monitoring the time required to fill the first clutch;

recording a digital value indicative of the time required to fill the first clutch in an electronic memory of the electronic transmission controller;

manually disconnecting the first pressure transducer from the first conduit; and manually disconnecting the first pressure transducer from the electronic transmission controller;

wherein the step of manually connecting to a first conduit includes the step of fluidly coupling the first pressure transducer to a quick connect coupling mounted on the transmission, and wherein the quick connect coupling is mounted on a transmission shaft bearing end cap.

9. The method of claim 8, wherein the end cap defines a cap hydraulic line that communicates hydraulic fluid to a shaft hydraulic fluid line machined in a transmission shaft supported in the transmission.

10. The method of claim 8, wherein the quick connect coupling is mounted on a clutch valve manifold that includes a plurality of electronically actuated clutch control valves for controlling a corresponding plurality of flows of hydraulic fluid to corresponding plurality of clutches in the transmission.

11. The method of claim 10, wherein the first clutch control valve is one of the plurality of valves.

* * * * *